United States Patent
Doherty et al.

(10) Patent No.: US 11,420,151 B2
(45) Date of Patent: Aug. 23, 2022

(54) AIR SEPARATION MODULES, NITROGEN GENERATION SYSTEMS, AND METHODS OF MAKING AIR SEPARATION MODULES

(71) Applicant: Hamilton Sundstrand Corporation, Charlotte, NC (US)

(72) Inventors: James R. Doherty, Feeding Hills, MA (US); Donald E. Army, Enfield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 152 days.

(21) Appl. No.: 16/787,764

(22) Filed: Feb. 11, 2020

(65) Prior Publication Data
US 2020/0254382 A1    Aug. 13, 2020

Related U.S. Application Data

(60) Provisional application No. 62/804,252, filed on Feb. 12, 2019.

(51) Int. Cl.
*B01D 53/22* (2006.01)
*B64D 13/06* (2006.01)

(52) U.S. Cl.
CPC ............ *B01D 53/22* (2013.01); *B64D 13/06* (2013.01); *B01D 2053/223* (2013.01); *B01D 2256/10* (2013.01); *B01D 2257/104* (2013.01); *B01D 2259/4575* (2013.01); *B64D 2013/0677* (2013.01); *B64D 2013/0681* (2013.01)

(58) Field of Classification Search
None
See application file for complete search history.

(56) References Cited

U.S. PATENT DOCUMENTS

| | | |
|---|---|---|
| 9,452,381 B2 | 9/2016 | Peacos, III et al. |
| 9,855,544 B2 | 1/2018 | Peacos, III et al. |
| 10,016,720 B2 | 7/2018 | Thibaud |
| 2006/0157403 A1* | 7/2006 | Harder ............... B01D 46/0005 210/445 |

(Continued)

FOREIGN PATENT DOCUMENTS

CN    103395748 A    11/2013

OTHER PUBLICATIONS

European Search Report Application No. EP20156849; dated Jul. 8, 2020; pp. 8.

*Primary Examiner* — Jason M Greene
(74) *Attorney, Agent, or Firm* — Cantor Colburn LLP

(57) ABSTRACT

An air separation module includes a canister, a separator, and a first end cap. The canister has an interior, a first open end in fluid communication with the interior of the canister, and a second end opposite the first open end of the canister. The separator is arranged within the interior of the canister, the separator fluidly coupling the second open end of the canister with the first open end of the canister. The first end cap has a one-piece first end cap body, is fixed to the first open end of the canister and has a first flange portion and a first aircraft-mounting portion. The canister supported by the first aircraft-mounting portion through the first flange portion of the one-piece first end cap body without an intermediate support structure. Nitrogen generation systems and methods of making nitrogen generation systems are also described.

18 Claims, 12 Drawing Sheets

(56) References Cited

U.S. PATENT DOCUMENTS

2012/0304856 A1* 12/2012 Kanetsuki ............. B01D 53/22
  95/47
2014/0360373 A1   12/2014 Peacos et al.
2016/0184761 A1*  6/2016 Peacos, III ............. B64D 13/06
  96/147

* cited by examiner

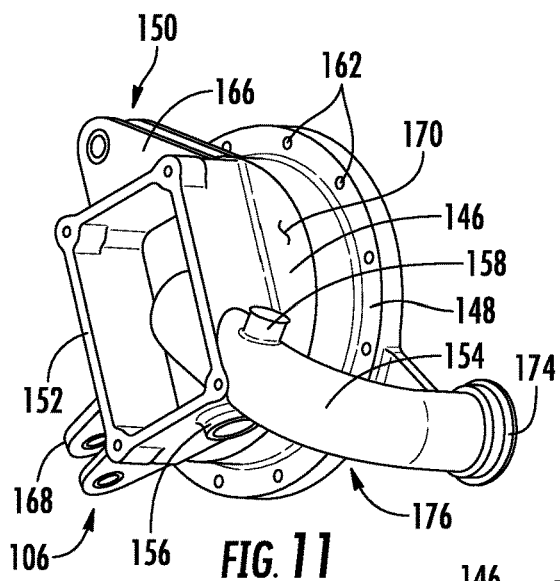
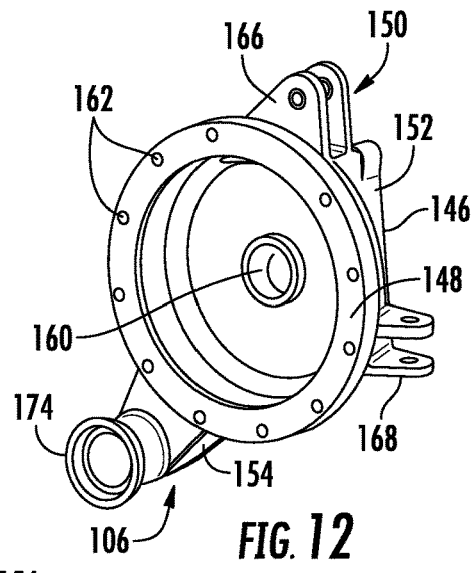
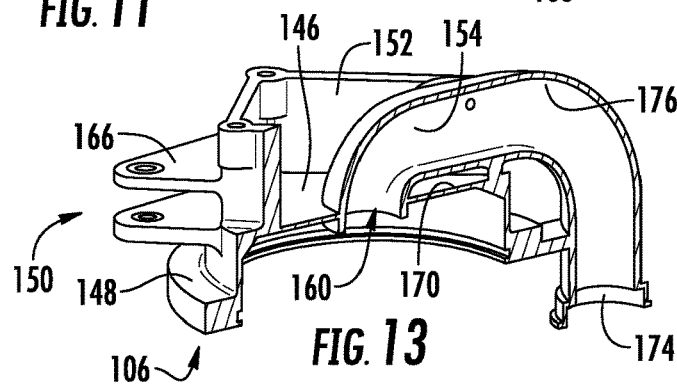
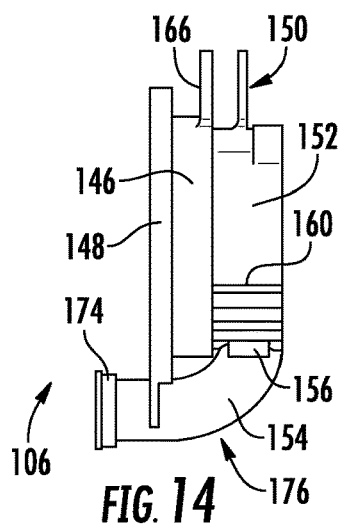
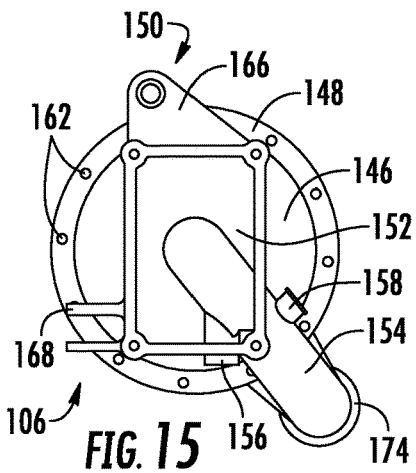
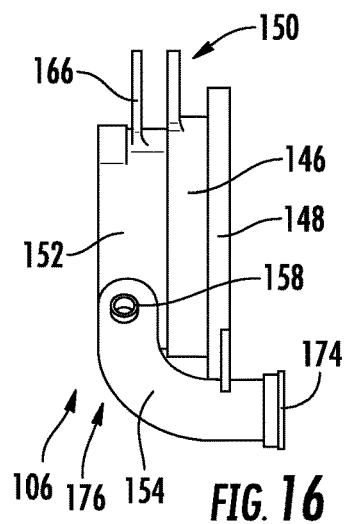
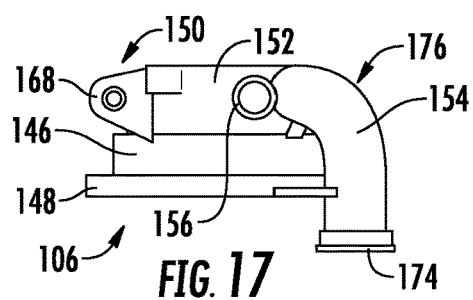

AIR SEPARATION MODULES, NITROGEN GENERATION SYSTEMS, AND METHODS OF MAKING AIR SEPARATION MODULES

CROSS-REFERENCE TO RELATED APPLICATIONS

This application claims priority to U.S. Provisional Application No. 62/804,252, filed on Feb. 12, 2019, the contents of which is incorporated herein by reference in its entirety.

BACKGROUND

The present disclosure generally relates to nitrogen generation systems, and more particularly to air separation modules for nitrogen generation systems.

Air separation systems on aircraft commonly utilize the pressure differential between air inside the aircraft and air outside the aircraft to separate air, such as cabin air or bleed air, into a first fraction that is slightly enriched with oxygen and a second fraction that is highly enriched with nitrogen. The nitrogen enriched air is supplied to the fuel tanks of the aircraft wherein the nitrogen enriched air provides an inert atmosphere inside the fuel tanks. Such air separation systems generally include canisters mounted within an external frame assembly. The external frame assembly is in turn mounted in aircraft and various interconnecting tubes, couplings, and mounting brackets are in turn connected to the air separation module, e.g., to convey fluids to and from the air separation system as well as to monitor the air separation system during operation.

Such systems and methods have generally been acceptable for their intended purpose. However, there remains a need for improved air separation modules, nitrogen generation systems, and methods of making air separation modules.

BRIEF DESCRIPTION

An air separation module is provided. The separation module includes a canister, a separator, and a first end cap. The canister has an interior, a first open end in fluid communication with the interior of the canister, and a second end opposite the first open end of the canister. The separator is arranged within the interior of the canister, the separator fluidly coupling the second open end of the canister with the first open end of the canister. The first end cap has a one-piece first end cap body, is fixed to the first open end of the canister and has a first flange portion and a first aircraft-mounting portion. The canister is supported by the first aircraft-mounting portion through the first flange portion of the one-piece first end cap body without an intermediate support structure.

In addition to one or more of the features described above, or as an alternative, further examples of the air separation module may include that the one-piece first end cap body has a boss portion defining an inlet therethrough, the inlet in fluid communication with the separator through the first open end of the canister.

In addition to one or more of the features described above, or as an alternative, further examples of the air separation module may include that the flange portion defines therethrough a fastener pattern, the air separation module further including two or more fasteners fixing the first end cap to the first open end of the canister.

In addition to one or more of the features described above, or as an alternative, further examples of the air separation module may include that the canister has a boss with a port, the boss arranged between the first open end of the canister and the second open end of the canister, the port in fluid communication with the first open end of the canister through the separator, and that the canister has one or more stiffener protruding outward from an outer surface of the canister.

In addition to one or more of the features described above, or as an alternative, further examples of the air separation module may include that the separator is configured to separate nitrogen molecules from oxygen molecules in pressurized air received at the first open end of the canister, the separator arranged to fluidly communicate the nitrogen molecules to the second open end of the canister, and the separator further arranged to fluidly communicate the oxygen molecules to a port defined between first open end and the second open end of the canister.

In addition to one or more of the features described above, or as an alternative, further examples of the air separation module may include a second end cap with a one-piece second end cap body, the one-piece second end cap body having a second flange portion and a conduit portion, the second flange portion fixing of the one-piece second end cap fixing the second end cap to the second open end of the canister, the conduit portion in fluid communication with the separator.

In addition to one or more of the features described above, or as an alternative, further examples of the air separation module may include that the second end cap one-piece body has an oxygen sensor seat portion, and that the conduit portion is in fluid communication with the oxygen sensor seat portion.

In addition to one or more of the features described above, or as an alternative, further examples of the air separation module may include a flow control valve seated directly on the conduit portion of the one-piece second end cap body.

In addition to one or more of the features described above, or as an alternative, further examples of the air separation module may include that the second end cap one-piece body has a temperature sensor seat portion, the air separation module further including a temperature sensor seated directly on the temperature sensor seat portion.

In addition to one or more of the features described above, or as an alternative, further examples of the air separation module may include that the one-piece second end cap body has an oxygen sensor probe seat portion, the air separation module further including an oxygen sensor probe seated directly on the oxygen sensor seat portion.

In addition to one or more of the features described above, or as an alternative, further examples of the air separation module may include an oxygen sensor seated directly on the oxygen sensor seat portion and a probe conduit fluidly coupling the oxygen sensor probe to the oxygen sensor, the probe conduit integrated with the one-piece first end cap body.

In addition to one or more of the features described above, or as an alternative, further examples of the air separation module may include that the first aircraft mounting portion extends radially outward from the flange portion, the first aircraft mounting portion defining a first clevis and a second clevis.

In addition to one or more of the features described above, or as an alternative, further examples of the air separation module may include a bleed air conduit fluidly coupled to the canister by the one-piece first end cap body and in fluid communication therethrough with the separator.

In addition to one or more of the features described above, or as an alternative, further examples of the air separation module may include that the air separation module is a single canister air separation module, the air separation module having one and not more than one canister.

A nitrogen generation system is also provided. The nitrogen generation system includes an air separation module as described above, the one-piece first end cap body having a boss portion defining an inlet therethrough, that is in fluid communication with the separator through the first open end of the canister; a second end cap with a one-piece second end cap body, the one-piece second end cap body having a second flange portion and a conduit portion, the second flange portion of the one-piece second end cap fixing the second end cap to the second open end of the canister, the conduit in fluid communication with separator; and a fuel tank fluidly coupled to the canister by the one-piece second end cap body and in fluid communication therethrough through the separator.

In addition to one or more of the features described above, or as an alternative, further examples of the nitrogen generation system may include that the flange portion of the first end cap defines therethrough a fastener pattern, the air separation module further including two or more fasteners fixing the first end cap to the first open end of the canister; and that the canister has a boss with a port, the boss arranged between the first open end of the canister and the second open end of the canister, the port in fluid communication with the first open end of the canister through the separator.

In addition to one or more of the features described above, or as an alternative, further examples of the nitrogen generation system may include the second end cap one-piece body has a temperature sensor seat portion, a temperature sensor seated directly on the temperature sensor seat portion and without an intermediate duct, and a flow control valve seated directly on the conduit portion of the one-piece second end cap body and without an intermediate duct.

A method of making an air separation module is additionally provided. The method includes defining a canister having an interior, a first open end in fluid communication with the interior of the canister, and a second end opposite the first open end of the canister. A separator is arranged within the interior of the canister such that the separator fluidly couples the second open end of the canister with the first open end of the canister. A first end cap with a one-piece first end cap body having a first flange portion and a first aircraft-mounting portion is defined and is fixed to the first open end of the canister, and the canister supported by the first aircraft-mounting portion through the first flange portion of the one-piece first end cap body without an intermediate support structure.

In addition to one or more of the features described above, or as an alternative, further examples of the method may include defining a second end cap with a one-piece second end cap body, the one-piece second end cap body having a second flange portion and a conduit portion; and fixing the second flange portion of the one-piece second end cap body to the second open end of the canister such that the conduit of the one-piece second end cap body is in fluid communication with the separator.

In addition to one or more of the features described above, or as an alternative, further examples of the method may include defining a temperature sensor seat portion on the one-piece second end cap body; seating a temperature sensor directly on the temperature sensor seat portion and without an intermediate duct; and seating a flow control valve directly on the conduit portion of the one-piece second end cap body and without an intermediate duct.

In addition to one or more of the features described above, or as an alternative, further examples of the method may include defining an oxygen sensor probe seat portion on the one-piece second end cap body; defining an oxygen sensor seat portion on the one-piece second end cap body; seating an oxygen sensor probe directly on the temperature sensor seat portion of the one-piece second end cap body; seating an oxygen sensor directly on the oxygen sensor seat of the of the one-piece second end cap body; and fluidly coupling the oxygen sensor probe to the oxygen sensor with a sensor conduit.

A dual canister air separation module is provided. The dual canister air separation module includes a canister set with a canister set, first and second separators, and a dual canister first end cap. The canister set includes a first canister and a second canister, the first and second canister each having an interior, a first end in fluid communication with the interior, and a second end in fluid communication with the first end through the interior of the canister. The first and second separators arranged within the interiors of the first canister and the second canister, the first separator fluidly coupling the second open end of the first canister with the first open end of the first canister, the second separator fluidly coupling the second open end of the second canister with the first open end of the second canister. The dual canister first end cap has a dual canister one-piece first end cap body having a first canister flange portion and a second canister flange portion, the first canister flange portion fixing the dual canister first end cap to the first end of the first canister, and the second canister flange portion fixing the dual canister first end cap to the first end of the second canister.

In addition to one or more of the features described above, or as an alternative, further examples of the dual canister air separation module may include that the first and second separators are arranged to separate a bleed air flow provided to the first canister and the second canister into oxygen-enriched air flows and a nitrogen-enriched air flows, the nitrogen-enriched air flows communicated to the second open ends of the first canister and the second canister.

In addition to one or more of the features described above, or as an alternative, further examples of the dual canister air separation module may include that the dual canister one-piece first end cap body has a boss portion, an aircraft-mounting portion, and a manifold portion.

In addition to one or more of the features described above, or as an alternative, further examples of the dual canister air separation module may include that the boss defines therethrough an inlet, and that the manifold portion dual canister one-piece first end cap body defines therethrough an inlet channel, the inlet channel fluidly coupling the inlet to the first canister and the second canister.

In addition to one or more of the features described above, or as an alternative, further examples of the dual canister air separation module may include that the aircraft-mounting portion terminates at a first clevis extending radially outward from the first canister flange portion, a second clevis extending radially outward from the second canister flange, and a third clevis extending from a location between the first canister flange portion and the second canister flange portion.

In addition to one or more of the features described above, or as an alternative, further examples of the dual canister air separation module may include that the dual canister one-piece first end cap body has a manifold portion defining therethrough an inlet channel, the inlet channel fluidly coupling the interior of the first canister with the interior of the second canister.

In addition to one or more of the features described above, or as an alternative, further examples of the dual canister air separation module may include that the manifold portion defines a tool aperture and that the air separation module further includes a plug seated in the tool aperture and fluidly separating the inlet channel from the external environment.

In addition to one or more of the features described above, or as an alternative, further examples of the dual canister air separation module may include a dual canister second end cap with a dual canister one-piece second end cap body having an oxygen sensor seat portion, a conduit portion, a temperature sensor seat portion, an oxygen sensor probe seat portion, and a manifold portion.

In addition to one or more of the features described above, or as an alternative, further examples of the dual canister air separation module may include an oxygen sensor seated on the oxygen sensor seat portion of the dual canister one-piece second end cap body, the oxygen sensor directly coupled to the dual canister one-piece second end cap body by the oxygen sensor seat portion.

In addition to one or more of the features described above, or as an alternative, further examples of the dual canister air separation module may include that the conduit portion of the dual canister one-piece second end cap body terminates at a flow control valve seat, and further comprising a flow control valve seated on the flow control valve seat and directly coupled to the dual canister one-piece second end cap body by the conduit portion and the flow control valve seat of the dual canister one-piece second end cap body.

In addition to one or more of the features described above, or as an alternative, further examples of the dual canister air separation module may include a temperature sensor seated on the temperature sensor seat portion of the dual canister one-piece second end cap body, the temperature sensor seat portion directly coupling the temperature sensor to the dual canister one-piece second end cap body.

In addition to one or more of the features described above, or as an alternative, further examples of the dual canister air separation module may include that the dual canister one-piece second end cap has an aircraft-mounting portion, the aircraft-mounting portion terminating at a first clevis and a second clevis, and that the first clevis and the second clevis extend radially outward from the first flange portion and the second flange portion of the dual canister one-piece second end cap.

In addition to one or more of the features described above, or as an alternative, further examples of the dual canister air separation module may include an oxygen sensor probe seated on the oxygen sensor probe seat of the dual canister one-piece second end cap body, the oxygen sensor probe directly coupled to the dual canister one-piece second end cap body by the oxygen sensor probe seat.

In addition to one or more of the features described above, or as an alternative, further examples of the dual canister air separation module may include that the dual canister one-piece second end cap body has a first canister flange portion and a second canister flange portion, the first canister flange portion fixing the dual canister second end cap to the second end of the first canister, and the second canister flange portion fixing the dual canister second end cap to the second end of the second canister.

In addition to one or more of the features described above, or as an alternative, further examples of the dual canister air separation module may include that the manifold portion defines therethrough an outlet channel, the outlet channel fluidly coupling a flow control valve seat defined by the conduit portion with the first canister and the second canister.

In addition to one or more of the features described above, or as an alternative, further examples of the dual canister air separation module may include that the temperature sensor seat portion is in fluid communication with first canister and the second canister through the manifold portion of the dual canister one-piece second end cap body.

In addition to one or more of the features described above, or as an alternative, further examples of the dual canister air separation module may include that the air separation module the air separation module has two not more than two canisters.

A dual canister nitrogen generation system is also provided. The dual canister nitrogen generation system includes a dual canister air separation module as described above. The dual canister one-piece first end cap body has a boss portion, an aircraft-mounting portion, and a manifold portion. The dual canister second end cap is fixed to the second end of the first canister and the second end of the second canister and has a dual canister one-piece second end cap body with an oxygen sensor seat portion, a conduit portion, a temperature sensor seat portion, an oxygen sensor probe seat portion, and a manifold portion.

In addition to one or more of the features described above, or as an alternative, further examples of the dual canister nitrogen generation system include that the dual canister one-piece second end cap body has a boss portion defining an inlet, that the manifold portion of the dual canister one-piece first end cap body defines therethrough an inlet channel, that the inlet channel fluidly couples the inlet to the first canister and the second canister and that the temperature sensor seat portion is in fluid communication with first canister and the second canister through the inlet channel of the dual canister one-piece second end cap body.

In addition to one or more of the features described above, or as an alternative, further examples of the dual canister nitrogen generation system include an oxygen sensor probe seated on the oxygen sensor probe seat of the dual canister one-piece second end cap body, an oxygen sensor seated on the oxygen sensor seat portion of the dual canister one-piece second end cap body, a probe conduit assembled to the dual canister second end cap and fluidly coupling the oxygen sensor probe to the oxygen sensor, a flow control valve seated on the flow control valve seat and directly coupled to the dual canister one-piece second end cap body by the conduit portion of the dual canister one-piece second end cap body, and a temperature sensor seated on the temperature sensor seat portion of the dual canister one-piece second end cap body.

In addition to one or more of the features described above, or as an alternative, further examples of the dual canister nitrogen generation system include a compressed air source fluidly coupled to the dual canister first end cap, and a fuel tank fluidly coupled to the dual canister second end cap and therethrough the dual canister first end cap by the first canister and the second canister.

A method of making a dual canister air separation module is additionally provided. The method includes defining a dual canister first end cap with a dual canister one-piece first end cap body having a first canister flange portion and a second canister flange portion using an additive manufacturing technique, fixing the first canister flange portion of the dual canister first end cap to a first end of a first canister, and fixing the second canister flange portion of the dual canister first end cap to a first end of a second canister.

Technical effects of the present disclosure include air separation modules with relatively simple arrangements, relatively small parts count, and/or being relatively simple to install or remove from the aircraft support structure. In certain examples air separation modules describe herein are self-supporting and includes tie rods or frame fixing the end caps to one another. In accordance with certain examples air separation modules described herein are compact, having end caps routing air flows through the end cap body and/or routing the air flow to sensors seated within the end cap. It is also contemplated that, in accordance with certain examples, end caps of the air separation module are connected directly to the aircraft structure supporting the air separation module, simplifying the installation and/or removal of the air separation module from the supporting aircraft structure.

BRIEF DESCRIPTION OF THE DRAWINGS

The following descriptions should not be considered limiting in any way. With reference to the accompanying drawings, like elements are numbered alike:

FIGS. 11-17 are perspective, plan, and side elevation views of the second end cap of the ASM of FIG. 1 according to the first example, showing a one-piece second end cap body having a flange portion, a mounting portion, and sensor seat portions, respectively;

DETAILED DESCRIPTION

Figure 1:
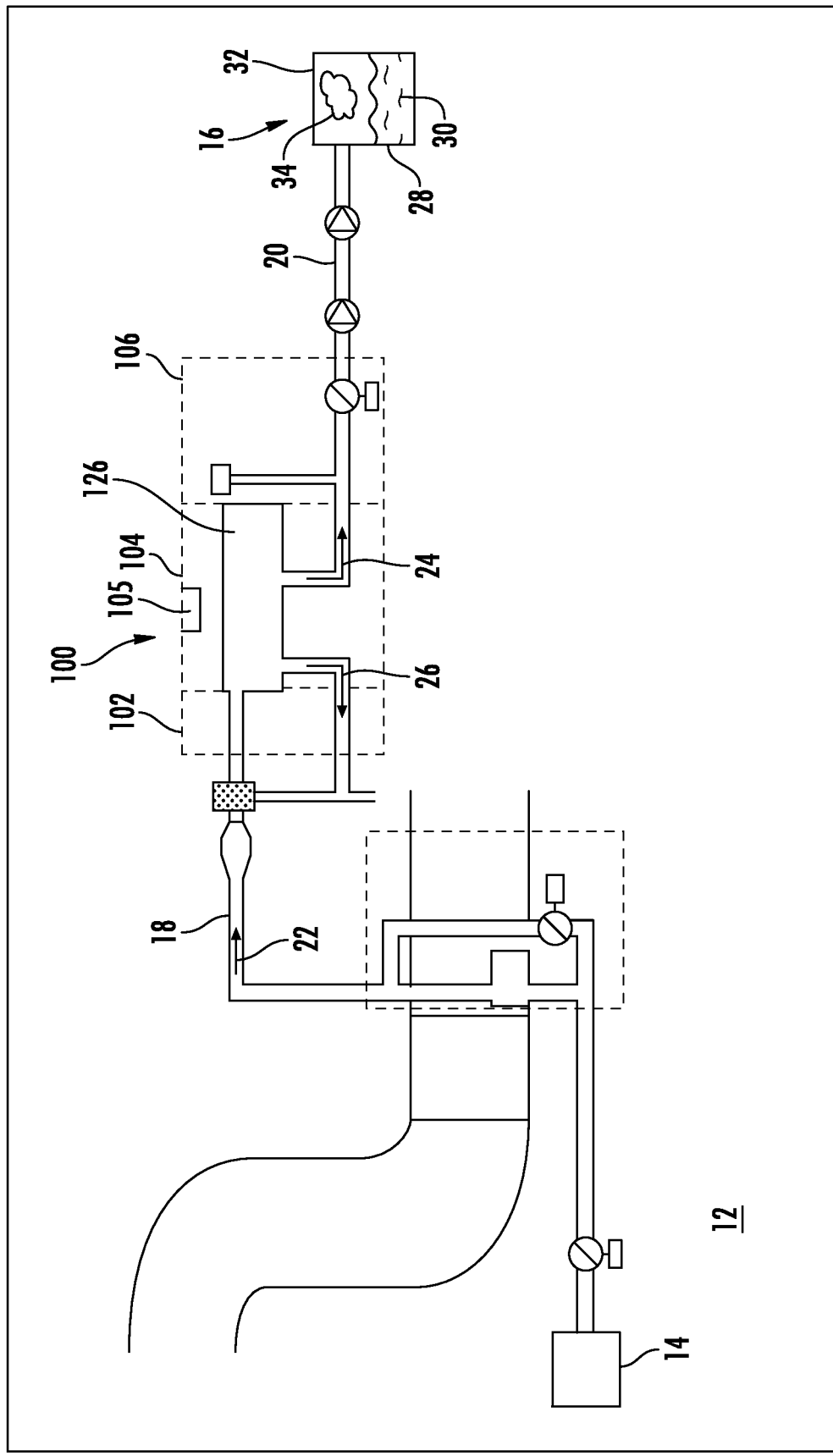
FIG. 1 is a schematic view of a nitrogen generation system (NGS) including an air separation module (ASM) constructed in accordance with the present disclosure, showing the ASM receiving a bleed air flow from a gas turbine engine and providing a nitrogen-enriched air flow to a fuel tank.

Reference will now be made to the drawings wherein like reference numerals identify similar structural features or aspects of the subject disclosure. For purposes of explanation and illustration, and not limitation, a partial view of an example of an air separation module constructed in accordance with the disclosure is shown in FIG. 1 and is designated generally by reference character 100. Other examples of air separation modules, nitrogen generation systems including air separation modules, and methods of making air separation modules in accordance with the present disclosure, or aspects thereof, are provided in FIGS. 2-36, as will be described. The systems and methods described herein can be used for inerting confined spaces on vehicles, such as with on-board inert gas generating systems (OBIGGS) for aircraft, though the present disclosure is not limited to OBIGGS for aircraft or to aircraft in general.

With reference to FIG. 1, a vehicle, e.g., an aircraft 10, is shown. The aircraft 10 includes a nitrogen generating system (NGS) 12, a compressed air source 14, and a fuel system 16. The NGS 12 includes the air separation module (ASM) 100, a bleed air conduit 18, and a nitrogen-enriched air conduit 20. The bleed air conduit 18 fluidly couples the ASM 100 to the compressed air source 14 such that the compressed air source 14 can provide to the ASM 100 a compressed air flow, e.g., a bleed air flow 22. The ASM 100 is configured to separate the bleed air flow 22 into a nitrogen-enriched air flow 24 and an oxygen-enriched air flow 26. In this respect the ASM 100 diverts the oxygen-enriched air flow 26 away from the fuel system 16, e.g., as an overboard flow, and fluidly communicate the nitrogen-enriched air flow 24 to the nitrogen-enriched air conduit 20.

The nitrogen-enriched air conduit 20 fluidly couples the ASM 100 to the fuel system 16. The fuel system 16 in turn includes a fuel tank 28 which is in fluid communication with the ASM 100 through the nitrogen-enriched air conduit 20. It is contemplated that the fuel tank 28 contain a volume of liquid fuel 30, that the liquid fuel 30 and the fuel tank 28 define therebetween an ullage space 32, and that a fuel vapor 34 at least partially inhabit the ullage space 32. It is also contemplated that the nitrogen-enriched air conduit 20 fluidly communicate the nitrogen-enriched air flow 24 to the ullage space 32, the nitrogen-enriched air flow 24 upon entry both displacing a portion of the fuel vapor 34 and reducing oxygen content within the ullage space 32 to limit (or prevent entirely) combustion of the fuel vapor 34 remaining within the fuel tank 28 in the event that an ignition source communicates with the fuel vapor 34.

As will be appreciated by those of skill in the art in view of the present disclosure, conventional air separation modules typically require tubing at the outlet side of the air separation module for the various devices fluidly coupled at the outlet end of the air separation module. Conventional air separation modules may also include couplings and flanges such as those marketed under the tradename Hydraflow® by the Hydraflow Corporation of Fullerton, Calif. Conventional air separation modules may additionally include a chassis structure and associated hardware, as well as separate mounting devises, to provide structural support to the air separation module and fixation of air separation module within an aircraft. While generally acceptable for their intended purpose, such components require assembly and add cost to such air separation modules.

To limit (or avoid entirely) the need for such components and associated cost, the ASM 100 is provided. The ASM 100 includes a canister, e.g., a canister 104 housing a separator 126, and end caps, e.g., a first end cap 102 and a second end cap 106, having one-piece bodies, e.g., a one-piece first end cap body 128 (shown in FIG. 5) and a one-piece second end cap body 146 (shown in FIG. 10). In certain examples the canister 104 has a stiffened wall 105 that cooperates with the first end cap 102 and the second end cap 106 to support the ASM 100 without requiring an external support frame. In accordance with certain examples the one-piece first end cap body 128 of the first end cap 102 and the one-piece second end cap body 146 of the second end cap 106 have flange portions and aircraft-mounting portions, e.g., a flange portion 130 (shown in FIG. 7) and an aircraft-mounting portion 134 (shown in FIG. 7), to transfer the load associated with the canister 104 directly to aircraft structure within the aircraft 10, supporting the ASM 100 without an external support like a frame, as will be described.

It is contemplated that, in certain examples, the one-piece first end cap body 128 (shown in FIG. 5) and the one-piece second end cap body 146 (shown in FIG. 10) include portions configured to directly seat thereon various sensors, limiting the need for ducting and enabling the load associated with such structure to be transferred directly to the aircraft supporting structure and without intermediate structure. For example, in accordance with certain examples the one-piece second end cap body 146 additionally has an oxygen sensor seat portion 152 (shown in FIG. 11), a temperature sensor seat portion 156 (shown in FIG. 11), and the conduit portion 154 (shown in FIG. 11) with a flow control valve seat 174 (shown in FIG. 11), allowing direct connection of sensors and a flow control valve to the second end cap 106. As will be appreciated by those of skill in the art in view of the present disclosure, such portions eliminate the need for tubing on the outlet side of the ASM 100, Hydraflow® couplings and flanges, chassis structure and hardware, and separate mounting devises, simplifying the assembly and rendering the ASM 100 relatively inexpensive in comparison to alternative OBIGGS devices. In this respect Applicant has determined that the cost associated by forming unitary end caps with one-piece end cap bodies having portions configured to directly accept components previously requiring intermediate structures is more than offset by the cost and time savings by eliminating the additional parts and time required to assembly conventional air separation modules.

Figure 2:
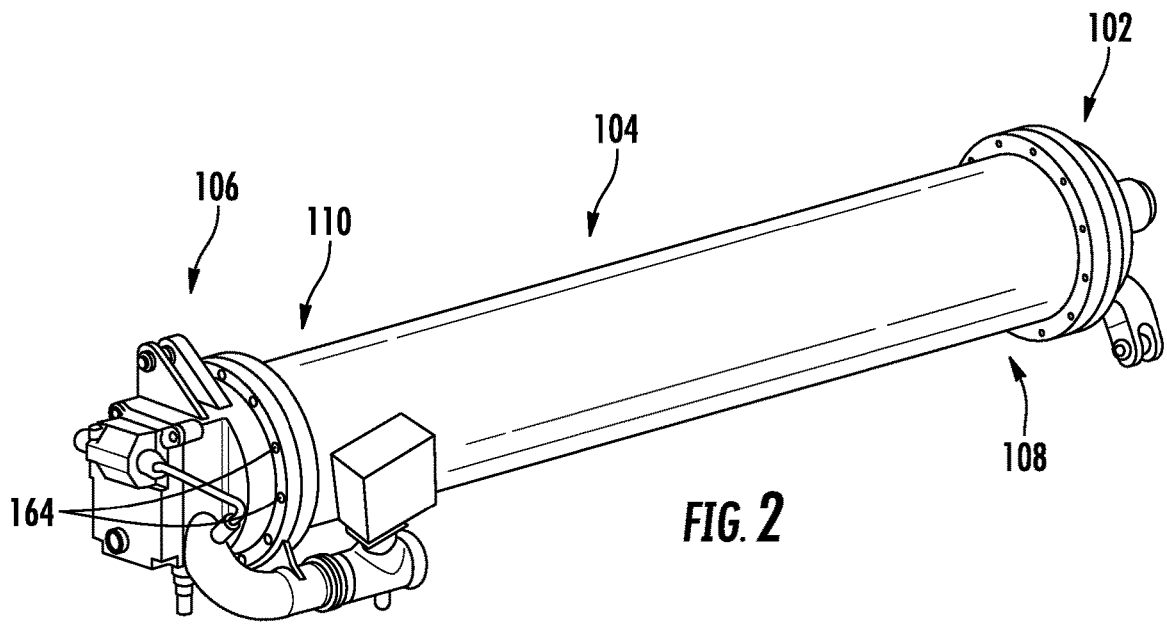
FIGS. 2 and 3 are perspective views of the ASM of FIG. 1 according to a first example, showing a single canister coupling a first end cap to a second end cap, respectively.
Figure 3:
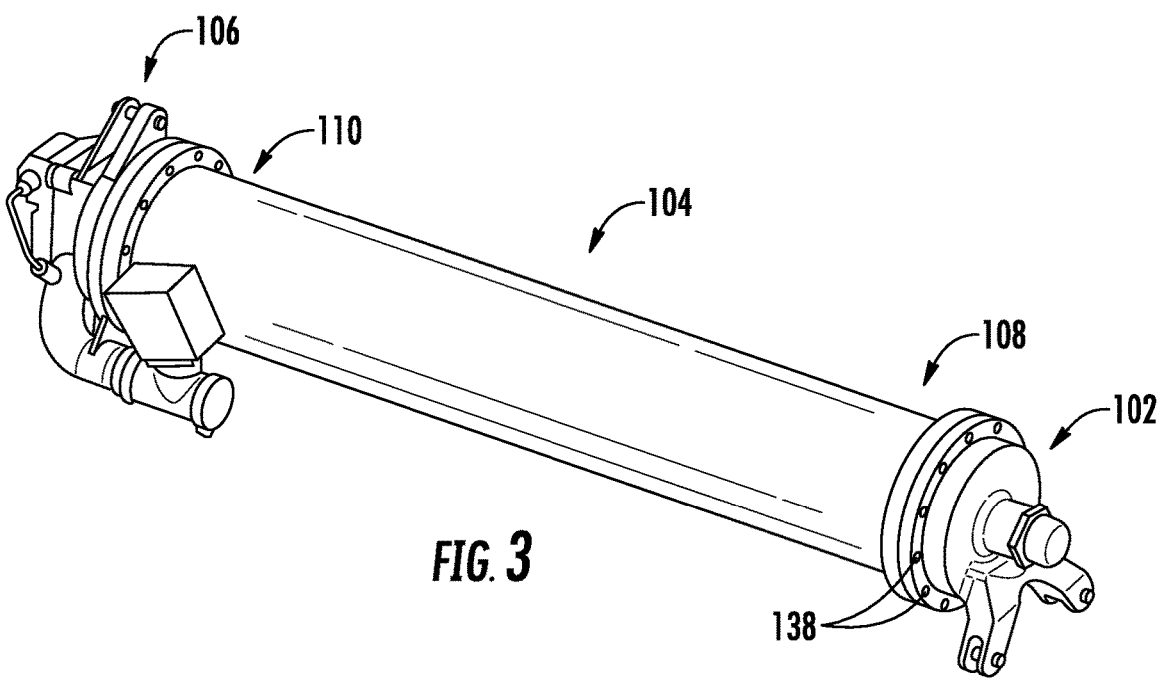

With reference to FIGS. 2 and 3, the ASM 100 is shown according to a first example. The ASM 100 generally includes the first end cap 102, the canister 104, and the second end cap 106. The canister 104 has a first open end 108, a second open end 110, and a boss 112 (shown in FIG. 4). The first end cap 102 is connected to the first open end 108 of the canister 104. The second end cap 106 is connected to the second open end 110 of the canister 104. The boss 112 defines a port 114 (shown in FIG. 4) and is arranged between the first open end 108 of the canister 104 and the second open end 110 of the canister 104. The port 114 is defined by the boss 112 and is in fluid communication with an interior 116 of the canister 104. In certain examples the air separation module 100 is a single canister air separation module 100 having one and not more than one canister 104.

Figure 4:
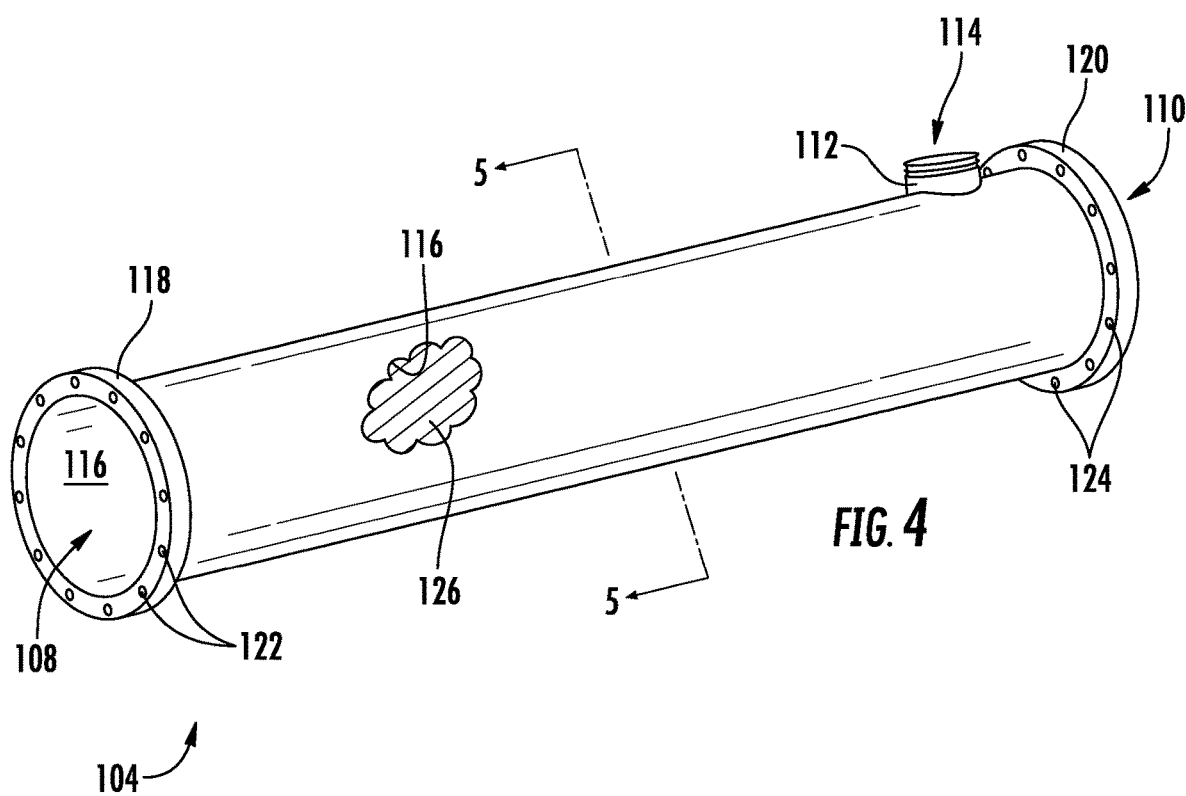
FIG. 4 is a perspective view of the canister of the ASM of FIG. 1 according to the first example, showing first and second open ends of the canister and a port defined between the first and second open ends of the canister.

With reference to FIG. 4, the canister 104 is shown. The canister 104 has a first flange 118 and a second flange 120. The first flange 118 extends about the first open end 108 of the canister 104 and defines therein (e.g., therethrough) a first fastener pattern 122. The first fastener pattern 122 is configured for fixation of the first end cap 102 (shown in FIG. 1) to the first open end 108 of the canister 104. The second flange 120 extends about the second open end 110 of the canister 104, is arranged on a side of the boss 112 opposite the first flange 118 and defines therein (e.g., therethrough) a second fastener pattern 124. The second fastener pattern 124 is configured for fixation of the second end cap 106 to the second open end 110 of the canister 104.

The separator 126 is arranged within the interior 116 of the canister 104 separate bleed air, e.g., the bleed air flow 22 (shown in FIG. 1) provided to the ASM into a nitrogen-enriched (or oxygen depleted) fraction, e.g., the nitrogen-enriched air flow 24 (shown in FIG. 1), and an oxygen-enriched fraction, e.g., the oxygen-enriched air flow 26 (shown in FIG. 1). In this respect the separator 126 separates constituent molecules within the bleed air flow 22 according to molecular size, communicates nitrogen molecules to the second open end 110 of the canister 104 to generate the nitrogen-enriched air flow 24, and communicates oxygen molecules to the port 114 to generate the oxygen-enriched air flow 26 (shown in FIG. 1). In certain examples the separator 126 includes a hollow fiber membrane (e.g., a rolled mat) having holes sized to admit oxygen molecules under pressure while limiting movement of nitrogen molecules through the hollow fiber membrane. Examples of suitable hollow fiber membranes include those available from a $O_2N_2$ Site Gas Systems of Newington, Conn.

Figure 5:
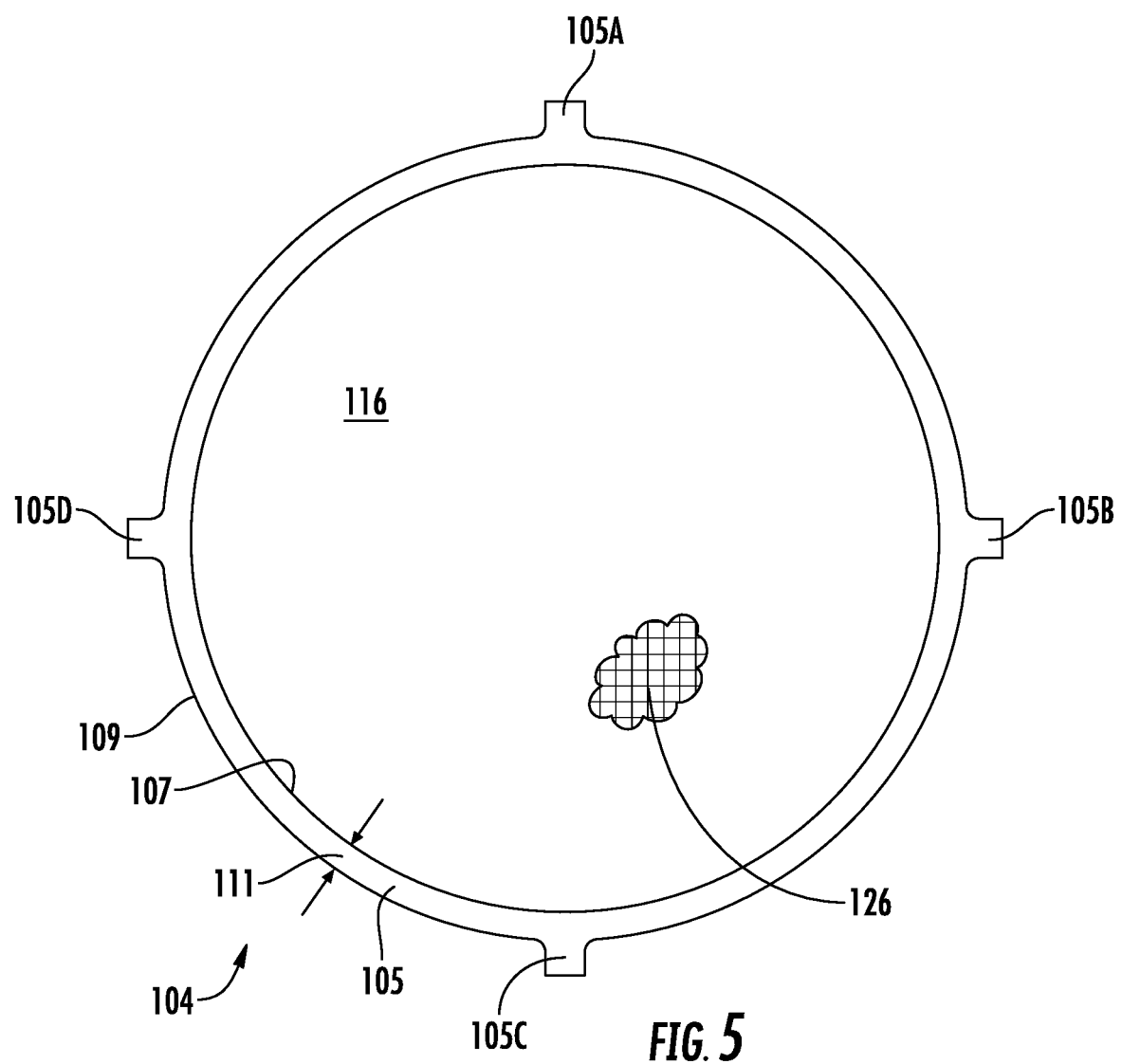
FIG. 5 is a cross-sectional view of the canister of the ASM of FIG. 1 according to an example, showing the profile of stiffeners extending radially from the outer surface of the canister and longitudinally between the first and second ends of the canister.

With reference to FIG. 5, the stiffened wall 105 is shown according to an example. As shown in FIG. 5 the canister 104 has an inner surface 107 and an outer surface 109. The canister 104 also defines a wall thickness 111 extending between the inner surface 107 and the outer surface 109. The canister 104 further defines and one or more stiffeners, e.g., stiffeners 105A-105D, which extend radially outward from the outer surface 109 and longitudinally along the canister 104 to increase stiffness of the canister 104 via the stiffened portion 105. The one or more stiffeners can be formed unitarily with the canister 104 as a one-piece body, e.g., by molding or extruding the canister 104 such that the one or more stiffeners protrude outward from the outer surface 109. In certain examples the one or more stiffeners 105A-105D span the canister 104 between the first end 104 (shown in FIG. 4) and the second end 114 (shown in FIG. 4) of the canister 104. As will be appreciated by those of skill in the art in view of the present disclosure, stiffening the canister 104 turns limits (or eliminates entirely) the need to support the ASM 100 (shown in FIG. 1) using an external frame or bracket to support the canister 104. In the illustrated example the canister 104 includes four (4) stiffeners equally spaced about the outer surface 109 of the canister 104. As will be appreciated by those of skill in the art in view of the present disclosure, the stiffened portion 105 of the canister 104 can include fewer than four (4) stiffeners or more than four (4) stiffeners, as suitable for an intended purpose.

With reference to FIGS. 6-10, the first end cap 102 is shown. The first end cap 102 includes the one-piece first end cap body 128. The one-piece first end cap body 128 has a flange portion 130, a boss portion 132 (shown in FIGS. 6, 8 and 9), and an aircraft-mounting portion 134.

Figure 6:
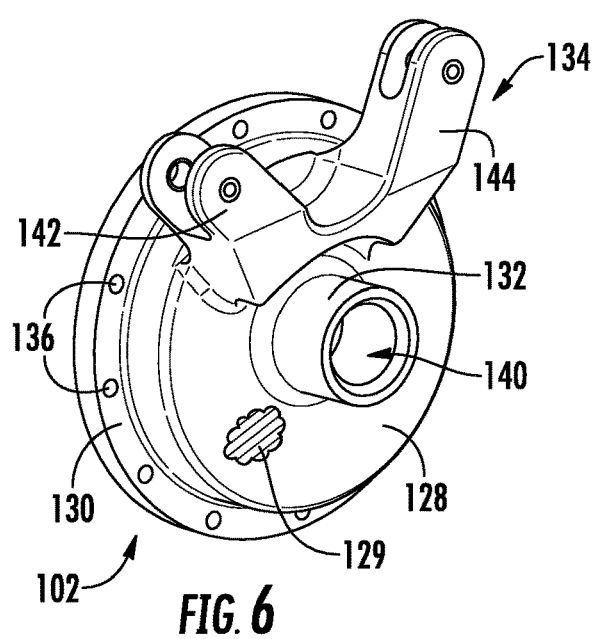
FIGS. 6-10 are perspective, plan, and side elevation views of the first end cap of the ASM of FIG. 1 according to the first example, showing a one-piece first end cap body having a flange portion and a mounting portion, respectively.
Figure 7:
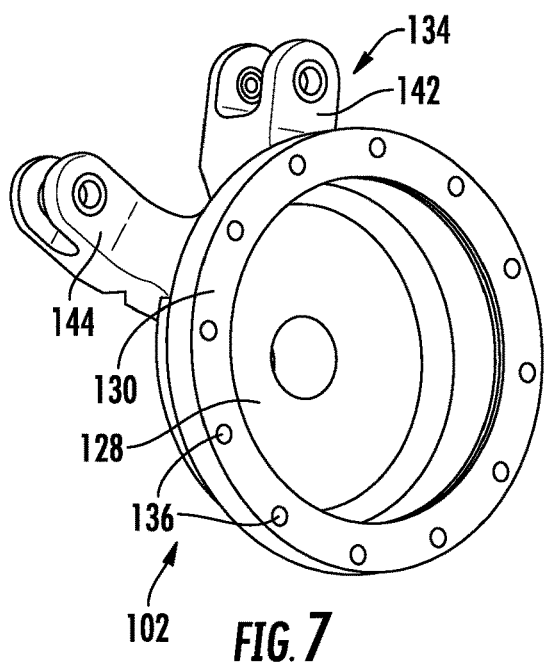
Figure 8:
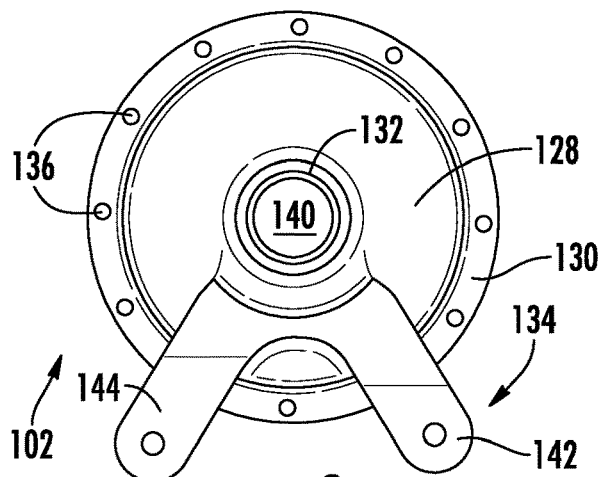
Figure 9:
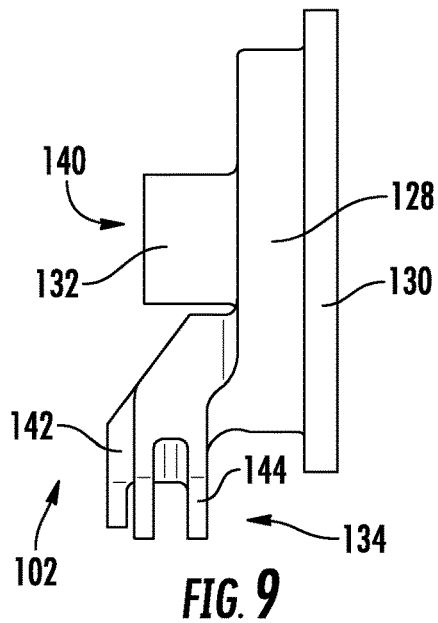
Figure 10:
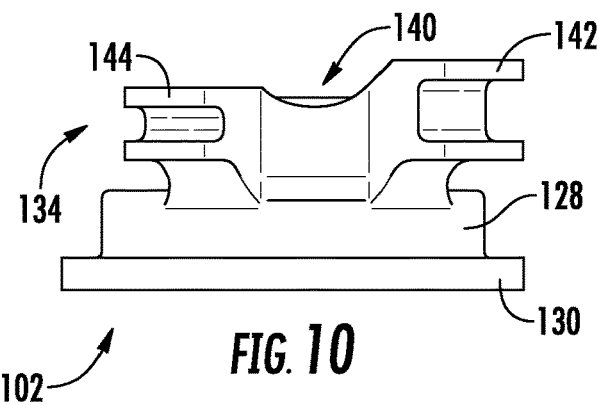

The flange portion 130 of the one-piece first end cap body 128 defines therethrough a first end cap fastener pattern 136 (shown in FIGS. 6-8). The first end cap fastener pattern 136 extends about the boss portion 132, corresponds to the first fastener pattern 122 defined by the first flange 118 of the canister 104, and is configured to receive therethrough fasteners 138 (shown in FIG. 3). The fasteners 138 in turn fix the one-piece first end cap body 128 to the first flange 118 of the canister 104 (shown in FIG. 1) by loading the first flange 118, and therethrough the canister 104, in tension. This allows the fasteners 138 to transfer at least partially the weight of the canister 104 through the flange portion 130 to the aircraft-mounting portion 134, limiting (or eliminating entirely) the need for an external support structure like a frame to support the canister 104.

The boss portion 132 (shown in FIGS. 6, 8 and 10) of the one-piece first end cap body 128 is configured to seat thereon the bleed air conduit 18 (shown in FIG. 1). In this respect the boss portion 132 defines therethrough an inlet 140. The inlet 140 is in turn in fluid communication with the interior 116 (shown in FIG. 4) of the canister 104 (shown in FIG. 1) to fluidly communicate the bleed air flow 22 (shown in FIG. 1) to the separator 126. This allows the separator 126, which is arranged within the interior 116 of the canister 104, to separate bleed air flow 22 into the nitrogen-enriched air flow 24 (shown in FIG. 1) and the oxygen-enriched air flow (shown in FIG. 1).

The aircraft-mounting portion 134 of the one-piece first end cap body 128 is configured for direct connection to the aircraft 10 (shown in FIG. 1). In this respect the aircraft-mounting portion 134 terminates at a first clevis 142 and a second clevis 144. The first clevis 142 and second clevis 144 each extend radially across the flange portion 130 and are in turn configured to receive therein aircraft structure mounting the ASM 100 (shown in FIG. 1) to the aircraft 10 (shown in FIG. 1). The first clevis 142 and the second clevis 144 are further configured to directly transfer (at least partially) the load associated with the canister 104 (shown in FIG. 1) to the aircraft structure of the aircraft 10 (shown in FIG. 1) directly, from the flange portion 130 through the aircraft-mounting portion 134 via the one-piece first end cap body 128, without an intermediate support structure like a frame. In the illustrated example the second clevis 144 has a width that is larger than that of the first clevis 142. The wider width of the second clevis 144 error-proofs the integration of the ASM 100 in the aircraft 10 by requiring that the ASM 100 have a predetermined orientation for fixation to aircraft structure within the aircraft 10. Although the aircraft mounting portion 134 is illustrated as having two (2) clevis structures it is to be understood and appreciated that the one-piece first end cap body 128 can have a single clevis or more than two (2) clevis structures and remain within the scope of the present disclosure.

It is contemplated that the one-piece first end cap body 128 be a unitary structure. In this respect the one-piece first end cap body 128 has a homogenous composition 129 (shown in FIG. 6) that defines each of the flange portion 130, the boss portion 132, and the aircraft-mounting portion 134. It is contemplated that the one-piece first end cap body 128 be formed from a metallic material, such as aluminum. In certain examples the one-piece first end cap body 128 can be formed using an investment casting technique. In accordance with certain example the one-piece first end cap body 128 can be formed using a molding technique. It is also contemplated that, in accordance with certain examples, the one-piece first end cap body 128 can be formed using an additive manufacturing technique. As will the appreciated by those of skill in the art in view of the present disclosure, casting, molding, and additive manufacturing techniques allow the one-piece first end cap body 128 to be formed as a unitary structure configured to directly seat sensors on the one-piece first end cap body 128 as well as directly support the canister 104, limiting (or eliminating entirely) the need for intermediate ducting and external support structures like frames.

With reference to FIGS. 11-16, the second end cap 106 is shown. The second end cap 106 is similar to the first end cap 102 (shown in FIG. 1) and additionally includes the one-piece second end cap body 146. The one-piece second end cap body 146 has a flange portion 148, an aircraft-mounting portion 150, an oxygen sensor seat portion 152. The one-piece second end cap body 146 also includes the conduit portion 154, a temperature sensor seat portion 156 (shown in FIGS. 11, 14, 15 and 17), and an oxygen sensor probe seat portion 158 (shown in FIGS. 11, 15 and 16).

The flange portion 148 of the one-piece second end cap body 146 extends about a canister outlet 160 (shown in FIGS. 12 and 13) and defines therethrough a fastener pattern 162 (shown in FIGS. 11, 12 and 15). The fastener pattern 162 corresponds to the second fastener pattern 124 defined by the second flange 120 (shown in FIG. 4) of the canister 104 (shown in FIG. 1) and is in turn configured to receive therethrough a plurality of fasteners 164 (shown in FIG. 2). The plurality of fasteners 164 fix the second end cap 106 to the second open end 110 (shown in FIG. 2) of the canister 104. It is contemplated that the flange portion 148 be further configured to support the canister 104 by transferring the load associated with the canister 104 through the aircraft-mounting portion 150, limiting (or eliminating entirely) the need for an external support structure like a frame to support the ASM 100 (shown in FIG. 1).

The aircraft-mounting portion 150 of the one-piece second end cap body 146 is configured for direct connection to support structure within the aircraft 10 (shown in FIG. 1). In this respect the aircraft-mounting portion 150 terminates at a first clevis 166 (shown in FIGS. 11-16) and a second clevis 168 (shown in FIGS. 11, 12, 14, 15 and 17). The first clevis 166 and the second clevis 168 extend radially outward from the fastener pattern 162 to receive therein the structure support structure within the aircraft 10. It is contemplated that the first clevis 166 and the second clevis 168 be configured to transfer the load associated with the canister 104 (shown in FIG. 1) from the fasteners 164 (shown in FIG. 2) through one-piece second end cap body 146 to the aircraft structure directly, without external structure like a frame. In the illustrated example the second clevis 168 offset in rotation relative to the first clevis 166 to simplify integration of the ASM 100 into the aircraft 10 by allowing the ASM 100 to be pivotably fixed to the aircraft structure with the aircraft 10. Although the aircraft mounting portion 150 is illustrated as having two (2) clevis structures it is to be understood and appreciated that the one-piece second end cap body 146 can have a single clevis or more than two (2) clevis structures and remain within the scope of the present disclosure.

The oxygen sensor seat portion 152 of the one-piece second end cap body 146 extends from an exterior surface 170 (shown in FIGS. 11 and 13) and is configured to directly seat an oxygen sensor 172 (shown in FIG. 19) on the one-piece second end cap body 146. Directly seating the oxygen sensor 172 on the one-piece second end cap body 146 simplifies assembly of the ASM 100 by integrating the oxygen sensor 172 with the one-piece second end cap body 146 without an intermediate structure, e.g., a bracket. In the illustrated example the oxygen sensor seat portion 152 extends in a direction opposite the flange portion 148 and about the canister outlet 160, providing compactness to the second end cap 206 by conforming the footprint of the oxygen sensor 172 to the contour of the one-piece second end cap body 146.

The conduit portion 154 of the one-piece second end cap body 146 fluidly couples the canister outlet 160 (shown in FIGS. 12 and 13) to the flow control valve seat 174. It is contemplated that the conduit portion 154 be in fluid communication with the oxygen sensor seat portion 152, e.g., the conduit portion 154 extending at least partially through the oxygen sensor seat portion 152. In the illustrated example the conduit portion 154 extends radially through the oxygen sensor seat portion 152 through an arcuate segment 176 and terminates at a flow control valve seat 174. The flow control valve seat 174 is positioned on a side of the fastener pattern 162 opposite the oxygen sensor seat portion 152 and is in turn configured to directly seat thereon a flow control valve 178 (shown in FIG. 2). Directly seating the flow control valve 178 on the flow control valve seat 174 simplifies the assembly of the ASM 100 (shown in FIG. 1) by integrating the flow control valve 178 directly to the ASM 100 without intermediate ducting. It also eliminates the need to support the flow control valve 178 with a support structure like a bracket, simplifying the assembly of the ASM 100.

Figure 19:
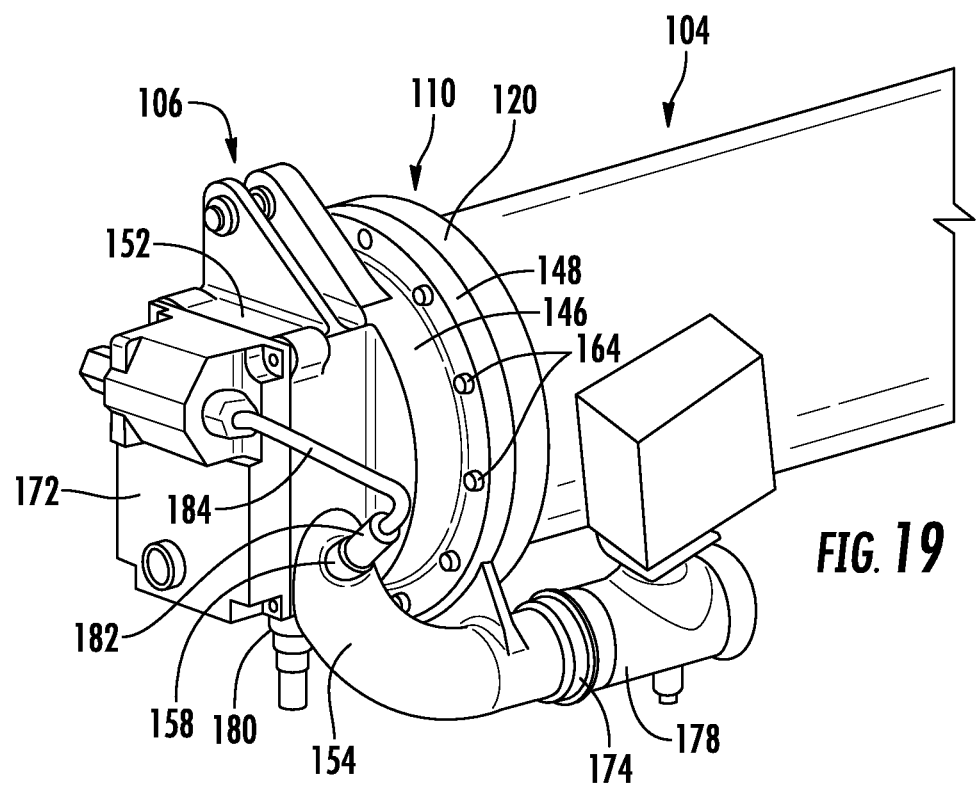

The temperature sensor seat portion 156 (shown in FIGS. 11, 14, 15 and 17) of the one-piece second end cap body 146 is in fluid communication with the canister outlet 160 and is configured to directly seat thereon a temperature sensor 180 (shown in FIG. 19). Directly seating the temperature sensor 180 on the one-piece second end cap body 146 simplifies assembly of the ASM 100 (shown in FIG. 1) by integrating the temperature sensor 180 with the one-piece second end cap body 146 without an intermediate duct. Directly seating the temperature sensor 180 to the one-piece second end cap body 146 also simplifies assembly of the ASM 100 by integrating the temperature sensor 180 with the one-piece second end cap body 146 without a support structure, like a bracket. In the illustrated example the temperature sensor seat portion 156 extends from the conduit portion 154 and through the oxygen sensor seat portion 152 and is fluid communication with the canister outlet 160 (shown in FIGS. 12 and 13) through the conduit portion 154. This provides spacing, e.g., by providing physical separation, the temperature sensor 180 apart from the oxygen sensor 172 and provide compactness to the second end cap 106.

The oxygen sensor probe seat portion 158 (shown in FIGS. 11, 15 and 16) of the one-piece second end cap body 146 is also in fluid communication with the canister outlet 160 and is configured to directly seat thereon an oxygen sensor probe 182 (shown in FIG. 19). Directly seating the oxygen sensor probe 182 on the one-piece second end cap body 146 simplifies assembly of the ASM 100 (shown in FIG. 1) by integrating the oxygen sensor probe 182 with the one-piece second end cap body 146 within an intermediate duct. Directly seating the oxygen sensor probe 182 on the one-piece second end cap body 146 simplifies assembly of the ASM 100 by integrating the oxygen sensor probe 182 without an intermediate support structure like a bracket. In the illustrated example the oxygen sensor probe seat portion 158 extends laterally from the conduit portion 154 at a location opposite the temperature sensor seat portion 156, providing compactness to the second end cap 206.

In certain examples the one-piece second end cap body 146 is formed from a metallic material, such as from aluminum. In accordance with certain examples the one-piece second end cap body 146 can be formed using a casting technique, such as investment casting. It is contemplated that the one-piece second end cap body 146 can be formed using a molding technique, an additive manufacturing technique, and/or in conjunction with a subtractive technique. As will the appreciated by those of skill in the art in view of the present disclosure, such techniques enable forming the one-piece second end cap body 146 as a unitary structure of homogenous composition, e.g., with a single material, the homogenous composition of the one-piece second end cap body defining the flange portion 148, the aircraft-mounting portion 150, the oxygen sensor seat portion 152, the conduit portion 154, the temperature sensor seat portion 156, and the oxygen sensor probe seat portion 158.

Figure 18:
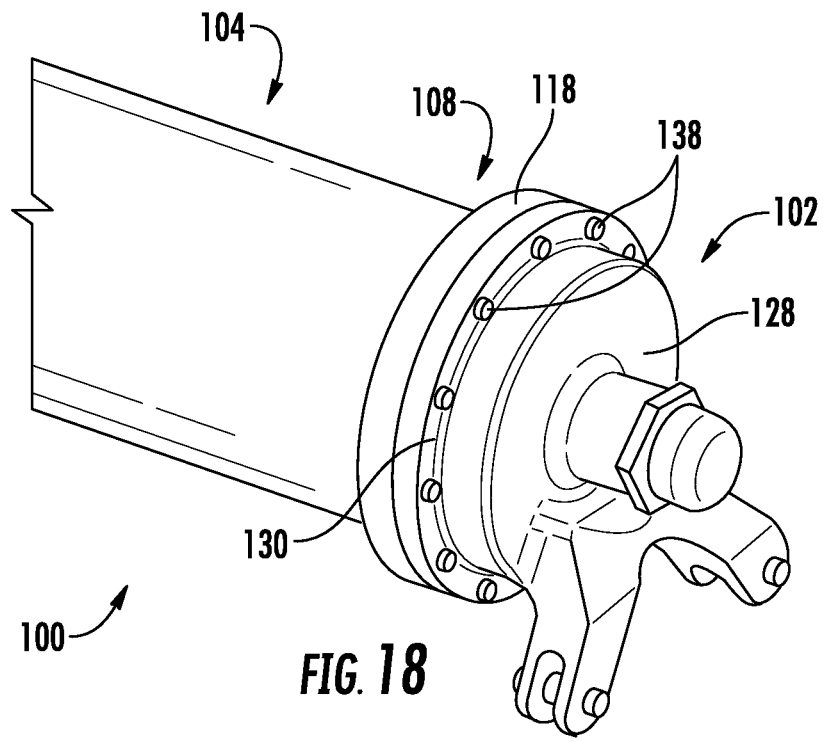
FIGS. 18 and 19 are partial perspective end views of the ASM of FIG. 1 according to the first example, showing the first end cap and the second end cap, respectively.

With reference to FIGS. 18 and 19, portions of the ASM 100 are shown including the first end cap 102 and the second end cap 106, respectively. As shown in FIG. 18, the first end cap 102 seats against the first open end 108 of the canister 104 such that the first flange 118 of the canister 104 abuts the flange portion 130 of the one-piece first end cap body 128. The flange portion 130 of the one-piece first end cap body 128 is registered relative to the first flange 118 of the canister 104 such that the first fastener pattern 136 (shown in FIG. 6) of the first flange 118 is aligned to the first end cap fastener pattern 122 (shown in FIG. 4) defined by the flange portion 130 of the one-piece first end cap body 128. The fasteners 138 are inserted through the flange portion 130 and seated (threadedly received) in the first flange 118 of the canister 104, integrating the one-piece first end cap body 128 with the canister 104.

As shown in FIG. 19, the second end cap 106 seats against the second open end 110 of the canister 104 such that the second flange 120 of the canister 104 abuts the flange portion 148 of the one-piece second end cap body 146. The flange portion 148 of the one-piece second end cap body 146 is in registration with the second flange 120 of the canister 104 such that the second fastener pattern 124 (shown in FIG. 4) of the second flange 120 is aligned to the fastener pattern 162 (shown in FIG. 11) defined by the flange portion 148 of the one-piece second end cap body 146. The fasteners 164 are inserted through the flange portion 148 and seated (threadedly received) within the second flange 120 of the canister 104, integrating the one-piece second end cap body 146 with the canister 104.

The temperature sensor 180 is integrated into the ASM 100 by seating directly the temperature sensor 180 on the temperature sensor seat portion 156 (shown in FIG. 11) of the one-piece second end cap body 146. The flow control valve 178 is integrated into the ASM 100 by seating directly the flow control valve 178 on the flow control valve seat 174 defined by the conduit portion 154. The oxygen sensor probe 182 is integrated into the ASM 100 by seating directly the oxygen sensor probe 182 on the oxygen sensor probe seat portion 158. The oxygen sensor 172 is turn integrated into the ASM 100 by seating directly the oxygen sensor 172 on the oxygen sensor seat portion 152. The oxygen sensor 172 is further fluidly coupled to the oxygen sensor probe 182 by the probe conduit 184, the probe conduit assembled to the second end cap 104 and thereby integrated into the ASM 100 to provide fluid communication between the oxygen sensor 172 and the oxygen sensor probe 182.

Figure 20:
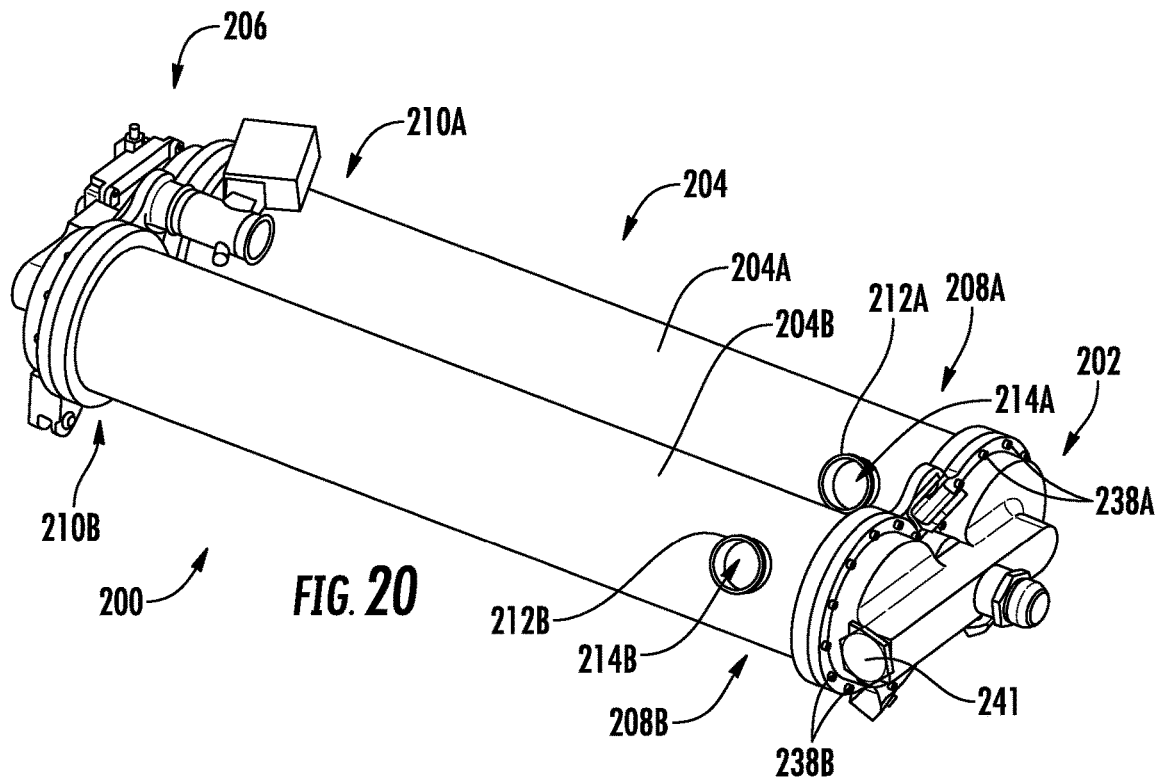
FIGS. 20 and 21 are perspective views of the ASM of FIG. 1 according to a second example, showing a first canister and a second canister coupling a first end cap to a second end cap, respectively.
Figure 21:
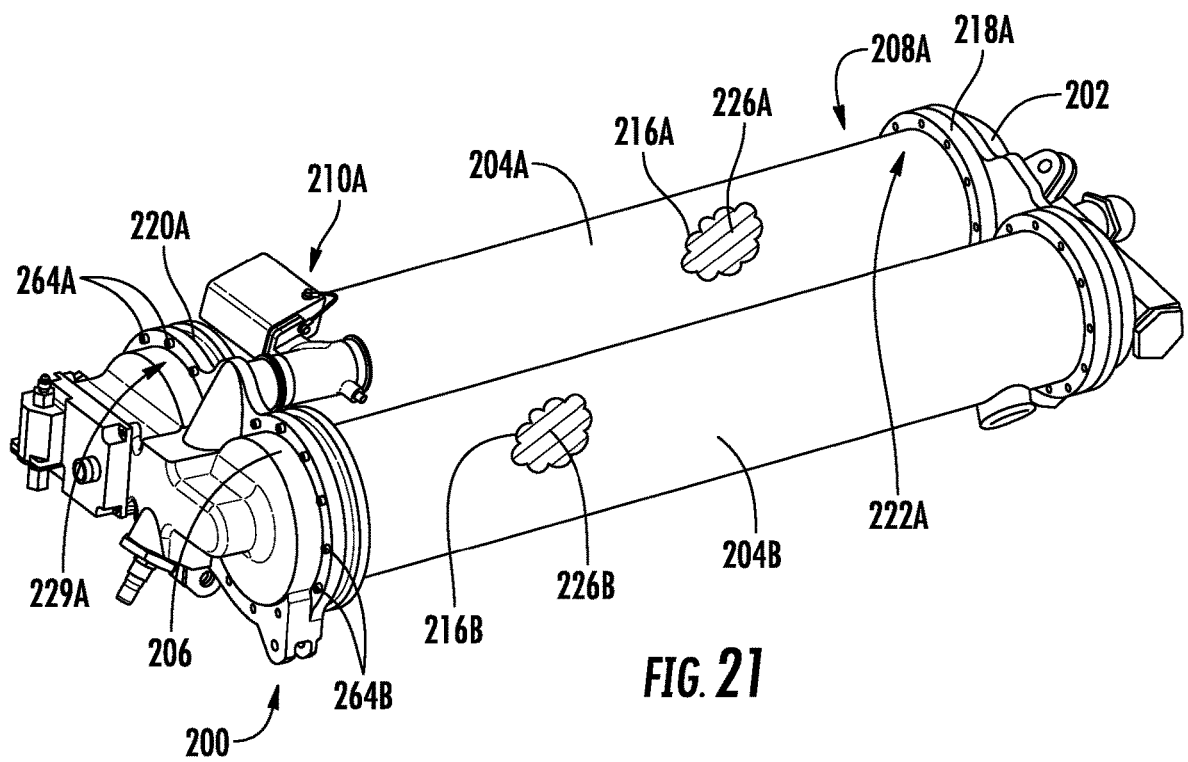
Figure 22:
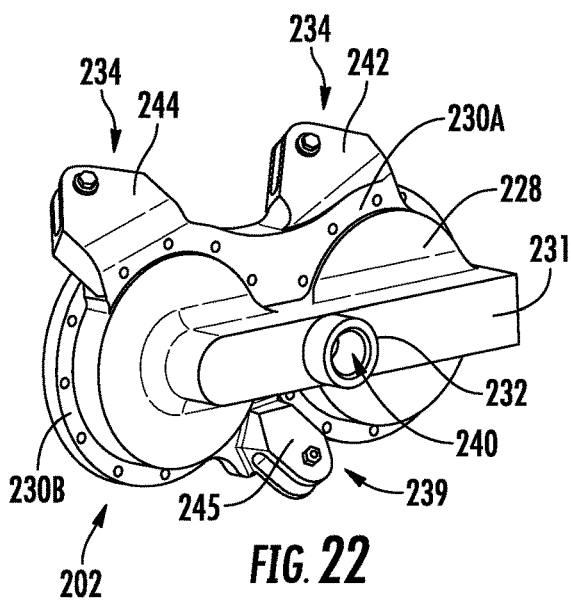
FIGS. 22 and 23 are partial perspective views of the ASM of FIG. 1 according to the second example, showing the first end cap and the second end cap, respectively.
Figure 23:
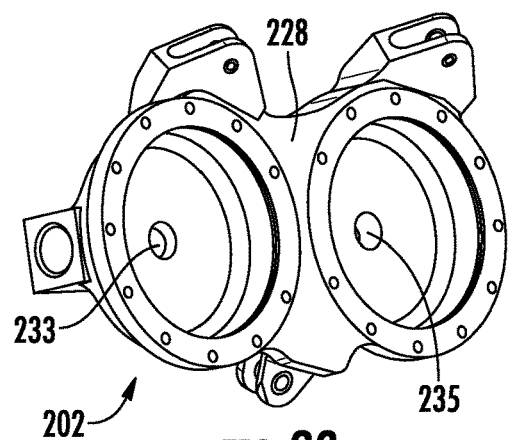

With reference to FIGS. 20 and 21, an ASM 200 is shown according to another example. The ASM 200 is similar to the ASM 100 (shown in FIG. 1) and includes a first end cap 202, a canister set 204, and a second end cap 206. Advantageously, employment of the canister set 204 in conjunction with a singular first end cap 202 and a singular second end cap 206 enables the ASM 200 to provide greater mass flow rates of nitrogen-enriched air with a single aircraft-mounting arrangement and accessory set, e.g., flow control valve, oxygen sensor, temperature sensor, etc., simplifying the arrangement of the nitrogen generation system employing the ASM 200 and/or limiting the associated installation envelope required for the ASM 200.

The canister set 204 includes a first canister 204A and a second canister 204B. The first canister 2014A and the second canister 204B are similar to the canister 104 (shown in FIG. 1) and in this respect the first canister 204A has a first open end 208A, an opposite a second open end 210A, and a boss 212A arranged between the first open end 208A and the second open end 210B. A port 214A is defined by the boss 212A and is in fluid communication with an interior 216A of the first canister 204A. The second canister 204B similarly has a first open end 208B, an opposite second open end 210B, and a boss 212B arranged between the first open end 208A and the second open end 210B. A port 214B is defined by the boss 212B and is in fluid communication with an interior 216B of the second canister 204B. In certain examples the air separation module 200 is a dual canister air separation module 200 having two and not more than two canisters, e.g., the first canister 204A and the second canister 204B.

As shown in FIG. 21, the first canister 204A includes a first flange 218A and a second flange 220A. The first flange 218A extends about the first open end 208A of the first canister 204A and defines therein a first fastener pattern 238A for fixation of the first end cap 202 to the first open end 208A of the first canister 204A. The second flange 220A extends about the second open end 210A of the first canister 204A, is arranged on a side of the boss 212A opposite the first flange 218A and defines therein a second fastener pattern 264A for fixation of the second end cap 206 to the second open end 210A of the first canister 204A. A first separator 226A is arranged within the interior 216A of the first canister 204A.

The second canister 204B includes a first flange 218B and a second flange 220B. The first flange 218B extends about the first open end 208B of the second canister 204B and defines therein a first fastener pattern 238B for fixation of the first end cap 202 to the first open end 208B of the second canister 204B. The second flange 220B extends about the second open end 210B of the second canister 204B, is arranged on a side of the boss 212B opposite the first flange 218B and defines therein a second fastener pattern 264B for fixation of the second end cap 206 to the second open end 210B of the second canister 204B. A second separator 226B is arranged within the interior 216B of the second canister 204B.

With reference to FIGS. 22-27, the first end cap 202 is shown. The first end cap 202 includes a dual canister one-piece first end cap body 228. The dual canister one-piece first end cap body 228 has a first canister flange portion 230A, a second canister flange portion 230B, and a boss portion 232. The dual canister one-piece first end cap body 228 also has an aircraft-mounting portion 234 and a manifold portion 231.

Figure 24:
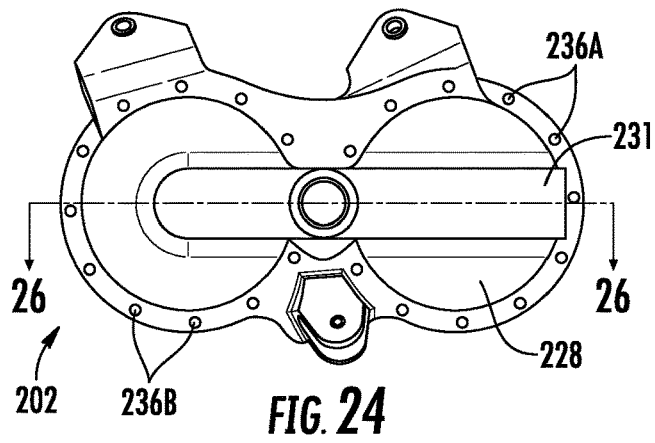
FIGS. 24-29 are perspective, plan, side elevation, and cross-sectional views of the first end cap of the ASM of FIG. 1 according to the second example, showing a one-piece first end cap body having a flange portion, a mounting portion, and manifold portion, respectively.

The first canister flange portion 230A defines therethrough a first end cap fastener pattern 236A (shown in FIG. 24). The first end cap fastener pattern 236A in turn extends about a first canister inlet 233 (shown in FIG. 23), is defined by the dual canister one-piece first end cap body 228 and is configured to receive therethrough fasteners 238 (shown in FIG. 20). The fasteners 238 fix the dual canister one-piece first end cap body 228 to the first flange 218A (shown in FIG. 21) of the first canister 204A (shown in FIG. 20) and further transfer, at least partially, the weight of the canister set 204 (shown in FIG. 20) through the first canister flange portion 230A to the aircraft-mounting portion 234 of the dual canister one-piece first end cap body 228. As will be appreciated by those of skill in the art in view of the present disclosure, this limits (or eliminates entirely) the need for an external support structure to support the canister set 204.

The second canister flange portion 230B defines therethrough a second end cap fastener pattern 236B (shown in FIG. 24). The second end cap fastener pattern 236B extends about a second canister inlet 235 (shown in FIG. 23), is defined by the dual canister one-piece first end cap body 228 and is configured to receive therethrough fasteners 264 (shown in FIG. 21). The fasteners 264 in turn fix the dual canister one-piece first end cap body 228 to the first flange 218B (shown in FIG. 21) of the second canister 204B. The fasteners 264 further transfer, at least partially, the weight of the canister set 204 (shown in FIG. 20) through the first canister flange portion 230A to the aircraft-mounting portion 234 of the dual canister one-piece first end cap body 228. As will be appreciated by those of skill in the art in view of the present disclosure, this also limits (or eliminates entirely) the need for an external support structure like a frame to support the canister set 204.

The boss portion 232 is configured to seat thereon the bleed air conduit 18 (shown in FIG. 1) and defines therethrough an inlet 240. The inlet 240 is in turn in fluid communication with both the first canister inlet 233 and the second canister inlet 235, and is therethrough in fluid communication with the interior 216A (shown in FIG. 21) of the first canister 204A (shown in FIG. 20) and the interior 216B (shown in FIG. 21) of the second canister 204B (shown in FIG. 20). This allows the first end cap 202 to fluidly communicate the bleed air flow 22 (shown in FIG. 1) to both the first separator 226A (shown in FIG. 21) and the second separator 226B (shown in FIG. 21) within the canister set 204 (shown in FIG. 20).

Figure 25:
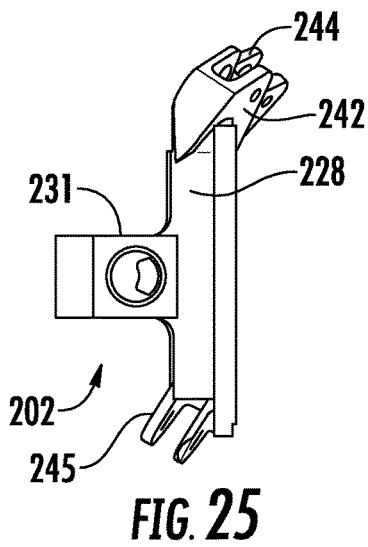
Figure 26:
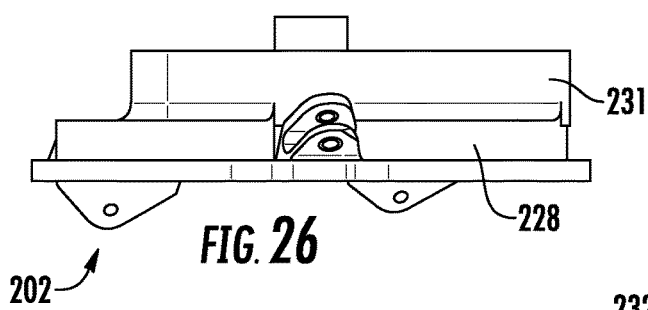

The aircraft-mounting portion 234 of the dual canister one-piece first end cap body 228 is configured for direct connection to the aircraft 10 (shown in FIG. 1). In this respect the aircraft-mounting portion 234 terminates at a first clevis 242, a second clevis 244, and a third clevis 245. The first clevis 242 extends radially outward from the first canister flange portion 230A, the second clevis extends radially outward from the second canister flange portion 230B, and the third clevis 245 extends outward from the dual canister one-piece first end cap body 228 from a side of the manifold portion 231 opposite the first clevis 242 and the second clevis 244. In the illustrated example the third clevis 246 extends from the dual canister one-piece first end cap body 228 at location between the first canister flange portion 230A and the second canister flange portion 230B. From these locations the aircraft-mounting portion 234 receives therein aircraft structure mounting for fixation of the ASM 200 (shown in FIG. 20) to the aircraft 10 (shown in FIG. 1). As shown in FIG. 25, it is contemplated that the third clevis 245 have a width larger than that of the first clevis 242 and the second clevis 244. This limits the installation orientation of the ASM 200 relative to the aircraft structure to error-proof the integration of the ASM 200 into the aircraft 10.

Figure 27:
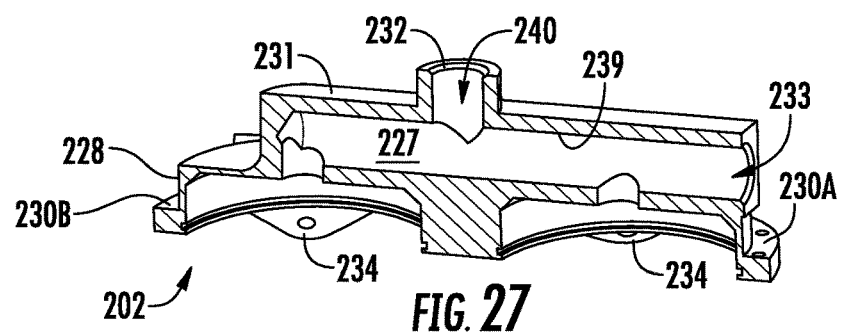

As shown in FIG. 27, the manifold portion 231 of the dual canister one-piece first end cap body 228 defines an inlet channel 227 and a tool aperture 229. The inlet channel 227 fluidly couples the inlet 240 defined by the boss portion 232 with the first canister inlet 233 and the second canister inlet 235. The inlet channel 227 is also in fluid communication with a tool aperture 229, which receives therein a plug 241 (shown in FIG. 20). The plug 241 fluidly separates the inlet channel 227 from the external environment through the tool aperture 229 the inlet channel 227, the manifold portion 231 thereby fluidly communicating the bleed air flow 22 (shown in FIG. 1) received at the inlet 240 to the first canister inlet 233 and the second canister inlet 235, and therethrough to the canister set 204.

With continuing reference to FIGS. 22-27, it is contemplated that the dual canister one-piece first end cap body 228 be a unitary structure. In this respect the dual canister one-piece first end cap body 228 has a homogenous composition 239 defining each of the first canister flange portion 230A, the second canister flange portion 230B, the boss portion 232, the aircraft-mounting portion 234, and the manifold portion 231. In certain examples the dual canister one-piece first end cap body 228 can be formed from a metallic material, such as from aluminum by way of non-limiting example. In accordance with certain examples the dual canister one-piece first end cap body 228 can be formed using an investment casting technique. It is also contemplated that, in accordance with certain examples, the dual canister one-piece first end cap body 228 can be formed using a molding technique or an additive manufacturing technique. As will the appreciated by those of skill in the art in view of the present disclosure, casting, molding, and additive manufacturing techniques allow for the dual canister one-piece first end cap body 228 to be formed as unitary structure having the homogenous composition and defining the above described portions, limiting (or eliminating entirely) the need for intermediate ducting and external support structures.

With reference to FIGS. 28-33, the second end cap 206 is shown. The second end cap 206 is similar to the first end cap 202 (shown in FIG. 20) and additionally includes a dual canister one-piece second end cap body 246. The dual canister one-piece second end cap body 246 has a first flange portion 248A, a second flange portion 248B, and an aircraft-mounting portion 250. The dual canister one-piece second end cap body 246 also has an oxygen sensor seat portion 252, a conduit portion 254, and a temperature sensor seat portion 256. The dual canister one-piece second end cap body 246 additionally has an oxygen sensor probe seat portion 258 and a manifold portion 251.

Figure 28:
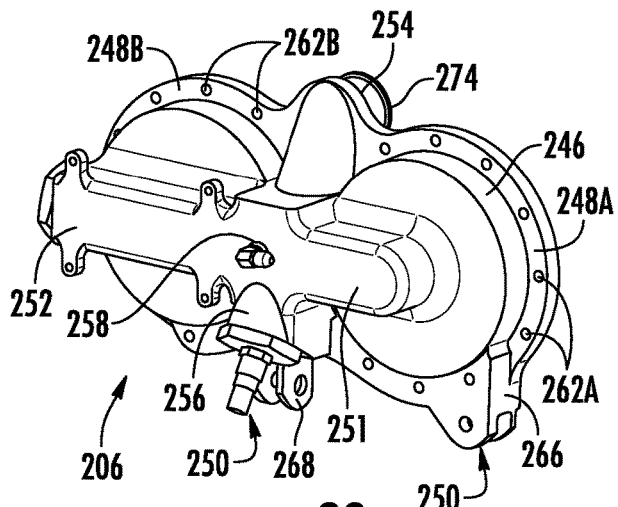
Figure 29:
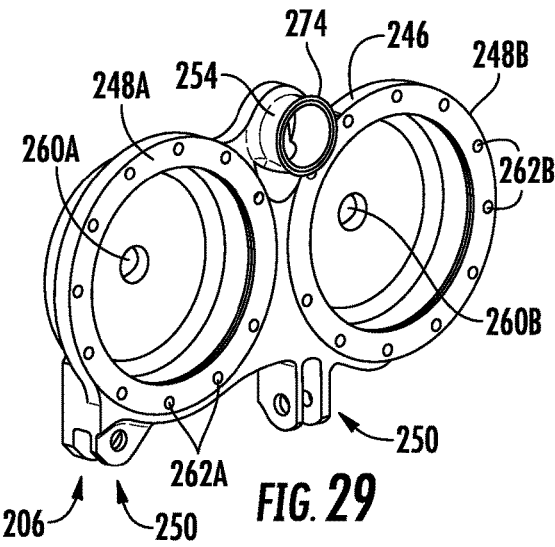
Figure 30:
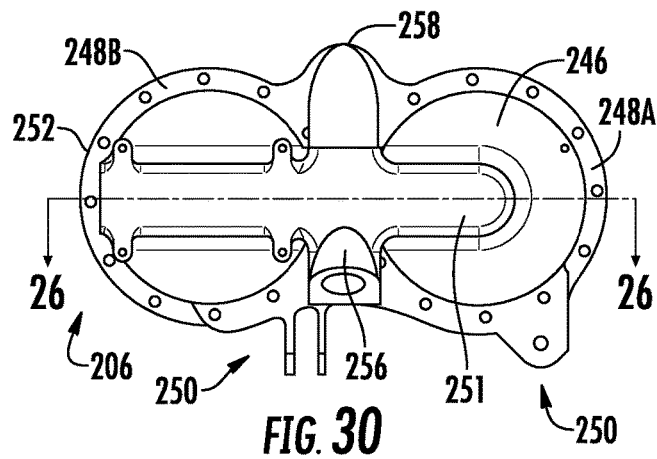
FIGS. 30-35 are perspective, plan, side elevation, and cross-sectional views of the second end cap of the ASM of FIG. 1 according to the second example, showing a one-piece second end cap body having a flange portion, a mounting portion, sensor seat portions, and a manifold portion, respectively.
Figure 31:
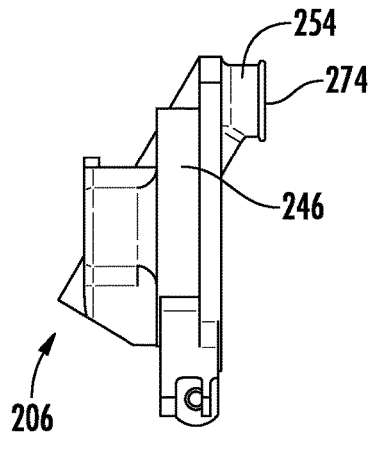
Figure 32:
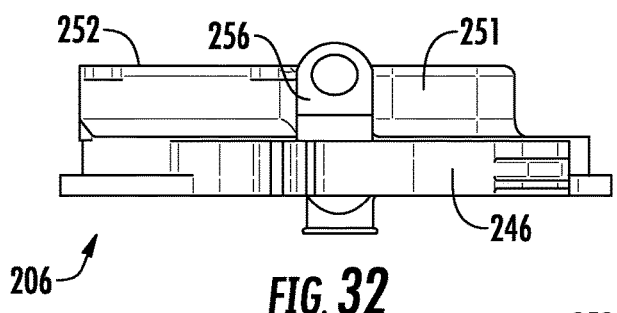

The first flange portion 248A of the dual canister one-piece second end cap body 246 extends about a first canister outlet 260A (shown in FIGS. 29 and 33) and defines therethrough a first fastener pattern 262A (shown in FIGS. 28-30). The first fastener pattern 262A corresponds to the second fastener pattern 224A (shown in FIG. 21) defined by the second flange 220A (shown in FIG. 21) of the first canister 204A (shown in FIG. 21) and in turn is configured to receive therethrough a plurality of fasteners 264A (shown in FIG. 21). The plurality of fasteners 264A in turn fix the second end cap 206 to the second open end 210A (shown in FIG. 20) of the canister set 204 (shown in FIG. 20). It is contemplated that the first flange portion 248A be configured to support the canister set 204 by directly transferring, at least partially, the load associated with the canister set 204 through the aircraft-mounting portion 250 of the dual canister one-piece second end cap body 246. As explained above, this limits (or eliminates entirely) the need for an external support structure like a frame to support the ASM 200 (shown in FIG. 20).

The second flange portion 248B of the dual canister one-piece second end cap body 246 extends about a second canister outlet 260B (shown in FIGS. 29 and 33) and defines therethrough a second fastener pattern 262B (shown in FIGS. 28-30). The second fastener pattern 262B of the second flange portion 248B corresponds to the second fastener pattern 224B (shown in FIG. 21) defined by the second flange 220B (shown in FIG. 21) of the second canister 204B (shown in FIG. 21) and is in turn configured to receive therethrough a plurality of fasteners 264B (shown in FIG. 21). The plurality of fasteners 264B fix the second end cap 206 to the second open end 210B (shown in FIG. 20) of the canister set 204 (shown in FIG. 20). It is contemplated that the second flange portion 248B be configured to support the canister set 204 by directly transferring, at least partially, the load associated with the canister set 204 through the aircraft-mounting portion 250 of the dual canister one-piece second end cap body 246. This also limits (or eliminates entirely) the need for an external support structure like a frame to support the ASM 200 (shown in FIG. 20).

The aircraft-mounting portion 250 of the dual canister one-piece second end cap body 246 is configured for direct connection to the aircraft 10 (shown in FIG. 1). In this respect the aircraft-mounting portion 250 terminates at a first clevis 266 and a second clevis 268. The first clevis 266 and the second clevis 268 extend radially outward from the first flange portion 248A and the second flange portion 248B, respectively, to receive therein aircraft structure to support the ASM 200 in the aircraft 10 (shown in FIG. 1). The first clevis 266 and the second clevis 268 are in turn configured to transfer the load associated with the canister set 204 (shown in FIG. 20) from the fasteners 264A (shown in FIG. 21) and the fasteners 264B (shown in FIG. 21) and through the first flange portion 248A and the second flange portion 248B of the dual canister one-piece second end cap body 246. It is contemplated that the second clevis 268 be offset in rotation relative to the first clevis 266 for pivotable fixation of the ASM 200 in the aircraft 10, simplifying installation and removal of the ASM 200 from the aircraft 10.

The oxygen sensor seat portion 252 of the dual canister one-piece second end cap body 246 extends from an exterior surface 270 (shown in FIGS. 11 and 13) of the dual canister one-piece second end cap body 246 in a direction opposite the first flange portion 248A and the second flange portion 248B and is configured seat thereon the oxygen sensor 172 (shown in FIG. 19). It is contemplated that the oxygen sensor seat portion 252 seat directly the oxygen sensor 172 to the dual canister one-piece second end cap body 246, e.g., without an intervening duct, simplifying the assembly of the ASM 200 (shown in FIG. 20). It is also contemplated that the oxygen sensor seat portion 252 transfer the load associated with the oxygen sensor 172 to the aircraft-mounting portion 250 directly through the dual canister one-piece second end cap body 246, simplifying the ASM 200 and/or limiting (or eliminating entirely) the need for an external structure like a frame to structurally support the ASM 200.

The conduit portion 254 of the dual canister one-piece second end cap body 246 terminates at a flow control valve seat 274 and fluidly couples the first canister outlet 260A (shown in FIGS. 29 and 33) and the second canister outlet 260B (shown in FIGS. 29 and 33) to the flow control valve seat 274. The flow control valve seat 274 is in turn configured to seat directly thereon a flow control valve 178 (shown in FIG. 19), the flow control valve seat 274 positioning the flow control valve 178 on a side of the manifold portion 251 opposite the temperature sensor seat portion 256. It is contemplated that the flow control valve seat 274 directly couple the flow control valve 178 to the dual canister one-piece second end cap body 246, e.g., without an intervening duct and/or support structure, simplifying the assembly of the ASM 200 (shown in FIG. 20). It is also contemplated that the conduit portion 254 transfer the load associated with the flow control valve 178 directly to the aircraft-mounting portion 250 through the dual canister one-piece second end cap body 246, limiting (or eliminating entirely) the need for an external structure or frame to structurally support the ASM 200.

The temperature sensor seat portion 256 (shown in FIGS. 28, 30 and 32) extends from the manifold portion 251 and is in fluid communication with the first canister outlet 260A (shown in FIGS. 29 and 33) through the manifold portion 251 of the dual canister one-piece second end cap body 246. The temperature sensor seat portion 256 is configured to seat directly thereon the temperature sensor 180 (shown in FIG. 35). It is contemplated that the temperature sensor seat portion 256 directly couple the temperature sensor 180 to the dual canister one-piece second end cap body 246, e.g., without an intervening duct, simplifying the assembly of the ASM 200 (shown in FIG. 20). It is also contemplated that the temperature sensor seat portion 256 transfer the load associated with the temperature sensor 180 to the aircraft-mounting portion 250 directly through the dual canister one-piece second end cap body 246, limiting (or eliminating entirely) the need for an external structure to structurally support the ASM 200.

Figure 33:
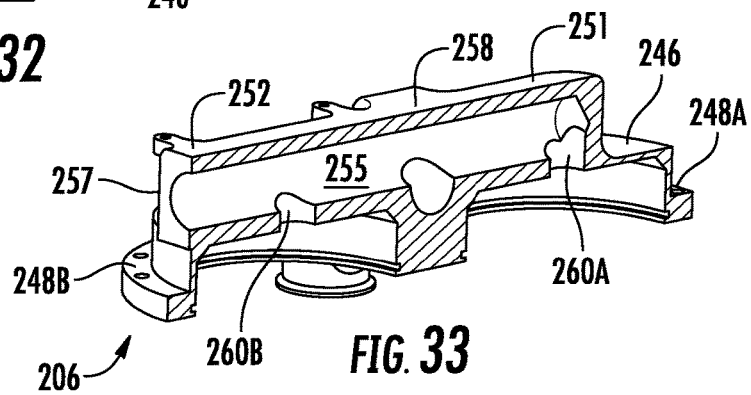

The oxygen sensor probe seat portion 258 (shown in FIGS. 28, 30, 32 and 33) extends from the manifold portion 251 and is in fluid communication therethrough with the first canister outlet 260A (shown in FIGS. 29 and 33). The oxygen sensor probe seat portion 258 is configured to seat thereon the oxygen sensor probe 182 (shown in FIG. 19), which is in turn fluidly coupled to the oxygen sensor 172 (shown in FIG. 2) by the probe conduit 184, the probe conduit 184 assembled to the second end cap 204. It is contemplated that the oxygen sensor probe seat portion 258 directly couple the oxygen sensor probe 182 to the dual canister one-piece second end cap body 246, e.g., without an intervening duct and/or support structure, simplifying the assembly of the ASM 200 (shown in FIG. 20). It is also contemplated that the oxygen sensor probe seat portion 158 transfer the load associated with the oxygen sensor probe 182, and at least partially (and/or in cooperation with the oxygen sensor seat portion 152) the load associated with the oxygen sensor 172 directly through the dual canister one-piece second end cap body 246 to the aircraft-mounting portion 250, limiting (or eliminating entirely) the need for an external support structure like a frame to structurally support the ASM 200.

As shown in FIG. 33, the manifold portion 251 of the dual canister one-piece second end cap body 246 defines an outlet channel 255 and a tool aperture 257. The outlet channel 255 fluidly couples the flow control valve seat 274 defined by the conduit portion 254 with the first canister outlet 260A and the second canister outlet 260B. The outlet channel 255 is also in fluid communication with a tool aperture 259, which in turn receives therein a plug 261 (shown in FIG. 35). The plug 261 fluidly separates the outlet channel 255 from the external environment through the tool aperture 259, the outlet channel 255 thereby fluidly communicating the nitrogen-enriched air flow 24 (shown in FIG. 1) received at the first canister outlet 260A and the second canister outlet 260B to the flow control valve seat 274.

With continuing reference to FIGS. 28-33, it is contemplated that the dual canister one-piece second end cap body 246 be a unitary structure. In this respect the dual canister one-piece second end cap body 246 has a homogenous composition 253 defining each of the first flange portion 248A, the second flange portion 248B, the aircraft-mounting portion 250, the oxygen sensor seat portion 252, the conduit portion 254, the temperature sensor seat portion 256, the oxygen sensor probe seat portion 258, and the manifold portion 251. In certain examples the dual canister one-piece second end cap body 246 can be formed from a metallic material, such as from aluminum by way of non-limiting example. In accordance with certain examples the dual canister one-piece second end cap body 246 can be formed using an investment casting technique. It is also contemplated that, in accordance with certain examples, the dual canister one-piece second end cap body 246 can be formed using a molding technique or an additive manufacturing technique. As will the appreciated by those of skill in the art in view of the present disclosure, casting, molding, and additive manufacturing techniques allow the dual canister one-piece second end cap body 246 to be formed as unitary structure having the homogenous composition and defining the above described portions, limiting (or eliminating entirely) the need for intermediate ducting and external support structures.

Figure 34:
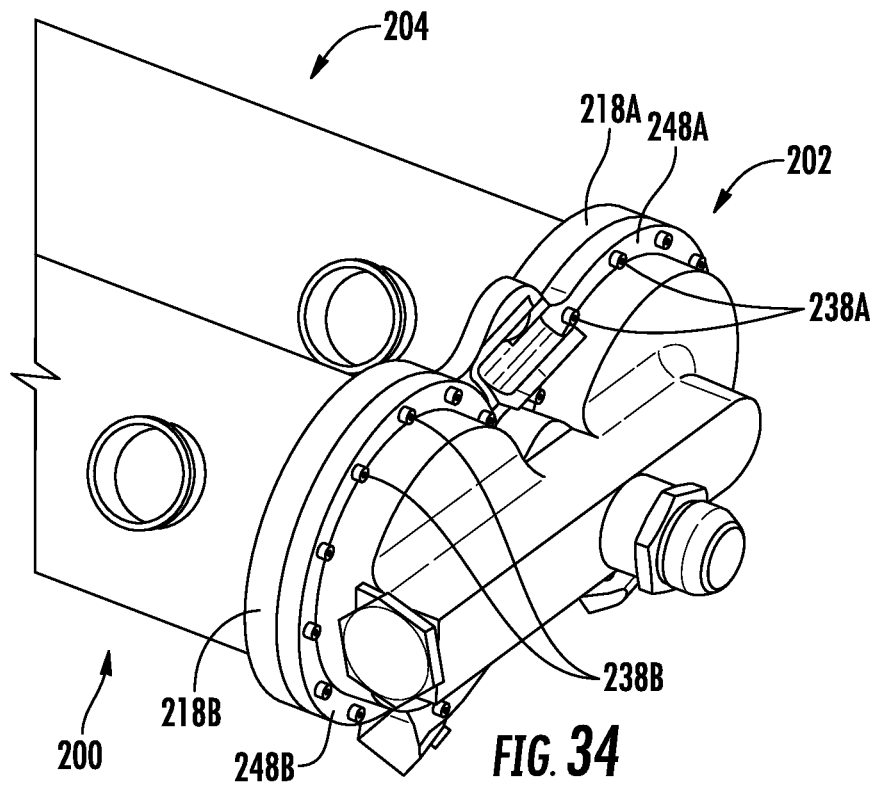
Figure 35:
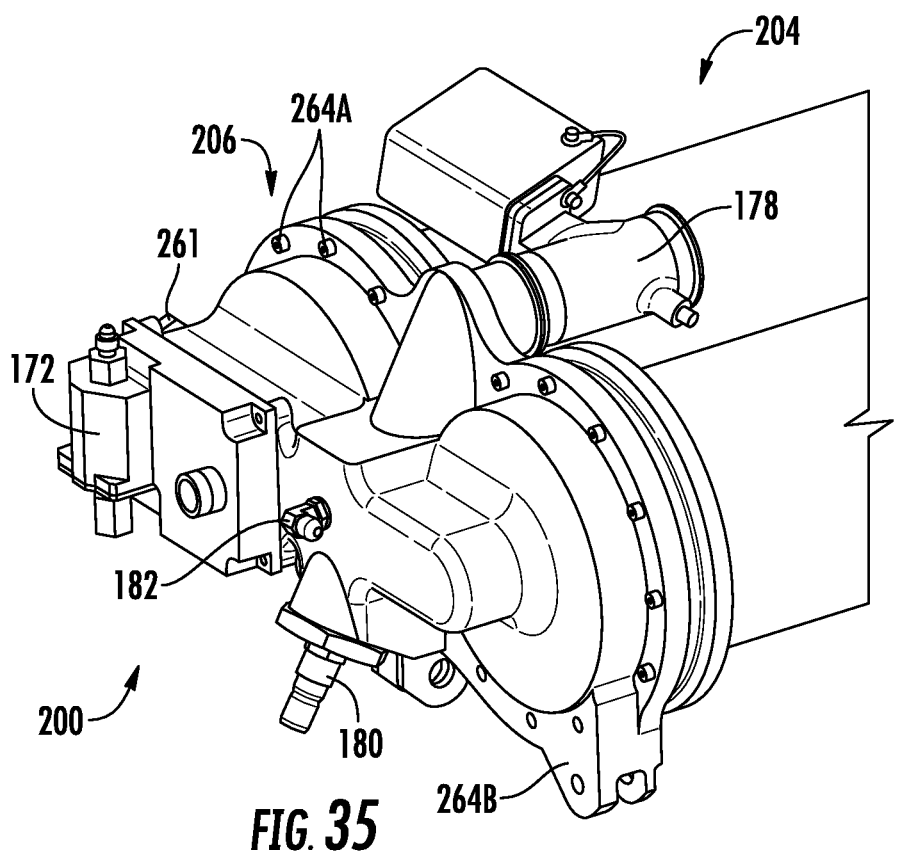

With reference to FIGS. 34 and 35, portions of the ASM 200 are shown including the first end cap 202 and the second end cap 206. As shown in FIG. 34, the first end cap 202 seats against the first open end 208A of the first canister 204A and the first open end 208B of the second canister 204B such that the first flange 218A of the first canister 204A abuts the first canister flange portion 230A of the dual canister one-piece first end cap body 228 and the first open end 208A abuts the second canister flange portion 230B. The first canister flange portion 230A of the dual canister one-piece first end cap body 228 is registered relative to the first flange 218A of the first canister 204A such that the first fastener pattern 222A of the first flange 218A is aligned to the first end cap fastener pattern 236A and the second fastener pattern 222B of the first flange 218B is aligned to the first end cap fastener pattern 236A. The fasteners 238 are inserted through the first canister flange portion 230A and seated (threadedly received) in the first flange 218A, and the fasteners 237 are inserted through the second canister flange portion 230B and seated (threadedly received) in the first flange 218B to integrate the canister pair 204 with dual canister one-piece first end cap body 202.

As shown in FIG. 35, the second end cap 206 seats against the second open end 210A of the first canister 204A and the second open end 210B of the second canister 204B such that the second flange 220A of the second canister 204A abuts the first flange portion 248A of the dual canister one-piece second end cap body 246 and the second open end 210A abuts the second canister flange portion 230B. The first canister flange portion 230A of the dual canister one-piece second end cap body 246 is registered relative to the second flange 220A of the first canister 204A such that the first fastener pattern 222A of the second flange 220A is aligned to the second end cap fastener pattern 262A and the second fastener pattern 262B of the second flange portion 248B is aligned to the second end cap fastener pattern 222B. The fasteners 264A are then inserted through the first canister flange portion 230A and seated in the first flange 218A and the fasteners 237 inserted through the second canister flange portion 230B and seated in the first flange 218B to integrate the canister pair 204 with the dual canister one-piece first end cap body 228.

The temperature sensor 180 is integrated into the ASM 200 by directly seating the temperature sensor 180 on the temperature sensor seat portion 256, the flow control valve 178 integrated into the ASM 200 by directly seating the flow control valve 178 on the flow control valve seat 274, and the oxygen sensor probe 182 integrated by seating the oxygen sensor probe 182 on the oxygen sensor probe seat portion 258. The oxygen sensor 172 is in turn integrated into the ASM 200 by seating the oxygen sensor 172 on the oxygen sensor seat portion 252, and further coupled to the oxygen sensor probe 182 by the probe conduit 184.

Figure 36:
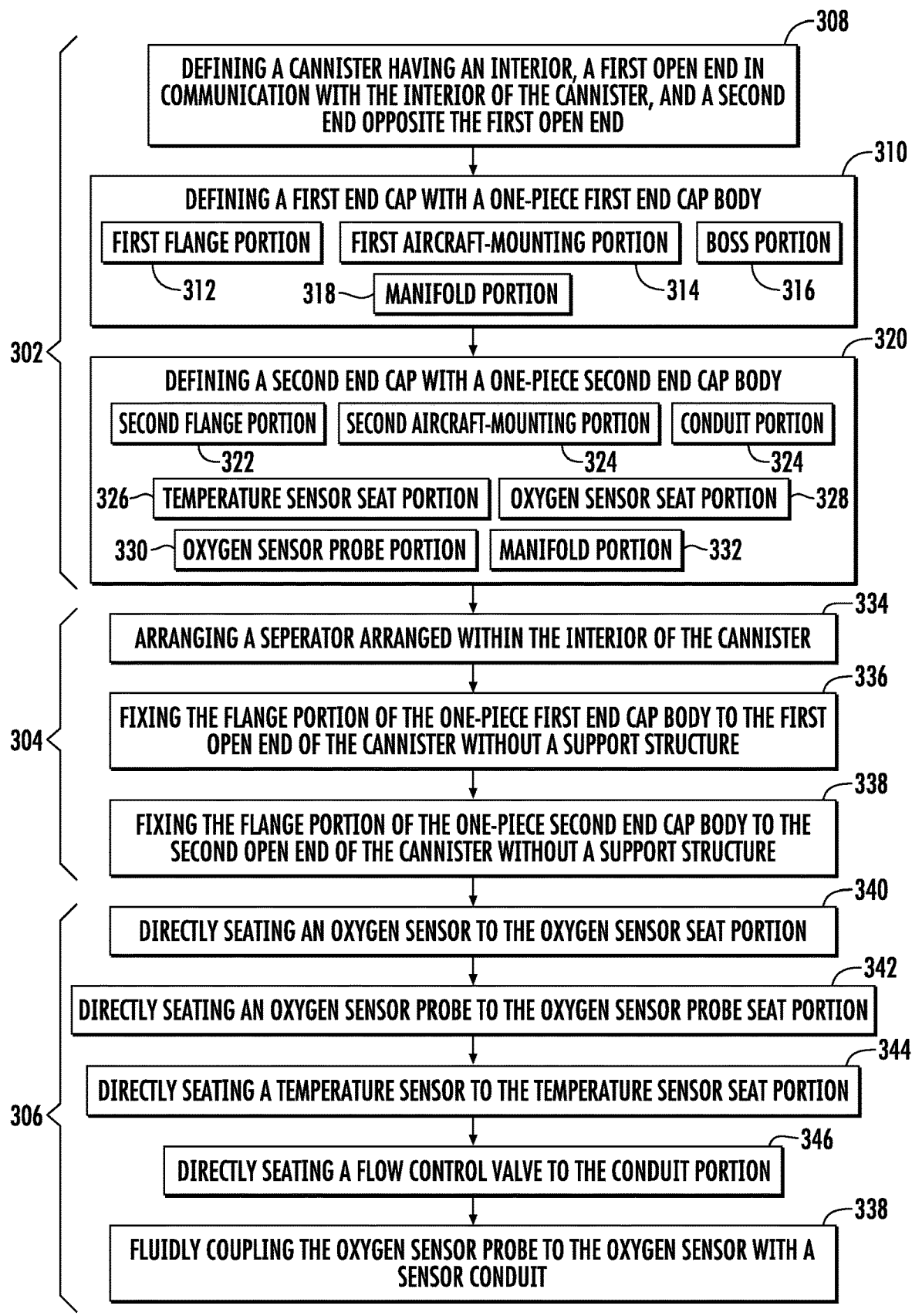
FIG. 36 is a block diagram of a method of making an ASM in accordance with the present disclosure, showing steps of the method according to an illustrative and non-limiting example of the method.

With reference to FIG. 36, a method 300 of making an ASM, e.g., the ASM 100 (shown in FIG. 1), is shown. The method generally includes defining a first end cap, e.g., the first end cap 102 (shown in FIG. 1), a canister, e.g., the canister 104 (shown in FIG. 1), and the second end cap 106 (shown in FIG. 1), as shown with bracket 302; integrating the first end cap and the second end cap with the canister, as shown with bracket 304; and integrating the ASM accessories with the second end cap, as shown with bracket 306. Although certain steps are shown in a particular order in the illustrated example of the method 300, it is to be understood that steps can be omitted, added, or performed in different order and remain within the scope of the present disclosure.

As shown with box 308, the canister is defined such that the canister has an interior, e.g., the interior 116 (shown in FIG. 1), a first open end, e.g., the first open end 108 (shown in FIG. 2), and a second open end, e.g., the second open end 110 (shown in FIG. 2). It is contemplated that a separator, e.g., the separator 126 (shown in FIG. 1) be arranged within the in the interior of the canister, as shown with box 334. In certain examples the canister is defined with a stiffened portion, e.g., the stiffened portion 105 (shown in FIG. 1). In accordance with certain examples the stiffened portion can be formed with one or more stiffeners, e.g., the stiffeners 105A-105D (shown in FIG. 5), the one or more stiffeners extending outward from an outer surface of the canister. It is contemplated that the stiffeners can be formed with the canister as a one-piece body, e.g., by molding or extruding the stiffeners in conjunction with the canister in a common molding or extrusion operation.

As shown box 310, the first end cap is defined by forming a one-piece first end cap body, e.g., the one-piece first end cap body 128 (shown in FIG. 6), having a plurality of portions formed from a homogenous composition, e.g., the homogenous composition 129 (shown in FIG. 6). It is contemplated that the first end cap body be formed with a first flange portion, e.g., the first flange portion 130 (shown in FIG. 6), as shown with box 312. It is also contemplated to that the one-piece first end cap body be formed with a first aircraft-mounting portion, e.g., the first aircraft-mounting portion 134 (shown in FIG. 6), as shown with box 314. It is additionally contemplated that the one-piece first end cap body be formed with a boss portion, e.g., the boss portion 132 (shown in FIG. 6), as shown with box 318. In certain examples flange portion can be a first canister flange portion, e.g., the first canister flange portion 230A (shown in FIG. 22) and the one-piece end cap body formed with a second canister flange portion, e.g., the second canister flange portion 230B (shown in FIG. 22), and a manifold portion, e.g., the manifold portion 231 (shown in FIG. 22), as shown with box 318.

As shown with box 320, the second end cap is defined by forming a one-piece second end cap body, e.g., the one-piece second end cap body 146 (shown in FIG. 11). It is contemplated that the one-piece second end cap body be formed with a flange portion, e.g., a flange portion 148 (shown in FIG. 11), and second aircraft mounting portion, e.g., the second aircraft mounting portion 150 (shown in FIG. 11), as shown with boxes 322 and 324. It is also contemplated that the one-piece second end cap body be formed with a conduit portion, e.g., the conduit portion 154 (shown in FIG. 11), and a temperature sensor seat portion, e.g., the temperature sensor seat portion 156 (shown in FIG. 1), as shown with boxes 324 and 326. It is additionally contemplated that the one-piece second end cap body be formed with an oxygen sensor seat portion, e.g., the oxygen sensor seat portion 152 (shown in FIG. 11), and an oxygen sensor probe seat portion, e.g., the oxygen sensor seat probe portion 158 (shown in FIG. 11), as shown with boxes 328 and 330. In certain examples the flange portion can be a first flange portion, e.g., the first flange portion 248A (shown in FIG. 28), and the one-piece second end cap body formed with a second flange portion, e.g., the second flange portion 248 (shown in FIG. 28), and a manifold portion 251 (shown in FIG. 28).

As shown with boxes 336 and 338, the flange portion of the one-piece first end cap body is fixed to the first open end of the canister and the flange portion of the one-piece second end cap body is fixed t the second open end of the canister. It is contemplated that the one-piece first end cap body be fastened to the first open end of the canister, e.g., with the fasteners 138 (shown in FIG. 3). It is also contemplated that the one-piece second end cap body be fastened to the second open end of the canister with fasteners, e.g., the fasteners 164 (shown in FIG. 2).

As shown with box 342, an oxygen sensor, e.g., the oxygen sensor 172 (shown in FIG. 1) is directly seated on the one-piece second end cap body within an intermediate duct. As shown with box 344, an oxygen sensor probe, e.g., the oxygen sensor probe 182 (shown in FIG. 1), is directly seated on the one-piece second end cap body without an intermediate duct. As shown with box 348, the oxygen sensor probe is connected to the oxygen sensor by a probe conduit, e.g., the probe conduit 184 (shown in FIG. 19), the probe conduit integrated with the one-piece second end cap body at a location external of the one-piece second end cap body. As shown with boxes 344 and 346, a temperature sensor, e.g., the temperature sensor 180 (shown in FIG. 1), is directly seated on the temperature sensor seat portion and a flow control valve without an intermediate duct, e.g., the flow control valve 178 (shown in FIG. 1), is directly seated on the conduit portion of the one-piece second end cap body without an intermediate duct.

The terminology used herein is for the purpose of describing particular examples only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary example or examples, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof

What is claimed is:

1. An air separation module, comprising:
a canister having an interior, a first open end in fluid communication with the interior of the canister, and a second open end opposite the first open end of the canister,
wherein the canister comprises stiffeners formed unitarily with the canister as a one-piece body and which extend radially outwardly from an outer surface of the canister and longitudinally along the canister between the first and second open ends to stiffen the canister and to eliminate a need to support the air separation module using a support structure, each of the stiffeners comprising fillets at respective bases thereof;
a separator arranged within the interior of the canister, the separator fluidly coupling the second open end of the canister with the first open end of the canister; and
a first end cap with a one-piece first end cap body fixed to the first open end of the canister, wherein the one-piece first end cap body has a flange portion and an aircraft-mounting portion, the canister supported by the aircraft-mounting portion through the flange portion of the one-piece first end cap body without an intermediate support structure.

2. The air separation module of claim 1, wherein the one-piece first end cap body has a boss portion defining an inlet therethrough, the inlet in fluid communication with the separator through the first open end of the canister.

3. The air separation module of claim 1, wherein the flange portion defines therethrough a fastener pattern and further comprising a plurality of fasteners fixing the first end cap to the first open end of the canister.

4. The air separation module of claim 1, wherein the canister has a boss with a port, the boss arranged between the first open end of the canister and the second open end of the canister, the port in fluid communication with the first open end of the canister through the separator.

5. The air separation module of claim 1, wherein the separator is configured to separate nitrogen molecules from oxygen molecules in air received at the first open end of the canister, the separator arranged to fluidly communicate the nitrogen molecules to the second open end of the canister, the separator further arranged to fluidly communicate the oxygen molecules to a port defined between first open end and the second open end of the canister.

6. The air separation module of claim 2, further comprising a second end cap with a one-piece second end cap body, the one-piece second end cap body having a second flange portion and a conduit portion, the second flange portion of the one-piece second end cap body fixing the second end cap to the second open end of the canister, the conduit portion of one-piece second end cap body in fluid communication with the separator.

7. The air separation module of claim 6, wherein the second end cap one-piece body comprises:
an oxygen sensor seat portion with an oxygen sensor seated directly thereon, wherein the conduit portion is in fluid communication with the oxygen sensor seat portion;
an oxygen sensor probe seat portion with an oxygen sensor probe seated directly on the oxygen sensor seat portion;
a flow control valve seated directly on the conduit;
a temperature sensor seat portion with a temperature sensor seated directly thereon; and a probe conduit integrated with the one-piece first end cap body and fluidly coupling the oxygen sensor probe to the oxygen sensor.

8. The air separation module of claim 1, wherein the aircraft-mounting portion extends radially outward from the flange portion, the aircraft-mounting portion defining a first clevis and a second clevis.

9. The air separation module of claim 1, further comprising a bleed air conduit fluidly coupled to the canister by the one-piece first end cap body and in fluid communication therethrough with the separator, and wherein the air separation module is a single canister air separation module having one and not more than one canister.

10. A nitrogen generator system, comprising:
an air separation module as recited in claim 1, wherein the one-piece first end cap body has a boss portion defining an inlet therethrough, the inlet in fluid communication with the separator through the first open end of the canister;
a second end cap with a one-piece second end cap body, the one-piece second end cap body having a second flange portion and a conduit portion, the second flange portion of the one-piece second end cap body fixing the second end cap to the second open end of the canister, the conduit portion of one-piece second end cap body in fluid communication with the separator; and
a fuel tank fluidly coupled to the canister by the one-piece second end cap body and in fluid communication therethrough through the separator.

11. The nitrogen generator system of claim 10, wherein the flange portion defines therethrough a fastener pattern and further comprising a plurality of fasteners fixing the first end cap to the first open end of the canister; and wherein the canister has a boss with a port, the boss arranged between the first open end of the canister and the second open end of the canister, the port in fluid communication with the first open end of the canister through the separator.

12. The nitrogen generator system of claim 10, wherein the second end cap one-piece body has a temperature sensor seat portion, and further comprising:
a temperature sensor seated directly on the temperature sensor seat portion and without an intermediate duct; and
a flow control valve seated directly on the conduit portion of the one-piece second end cap body and without an intermediate duct.

13. A method of making an air separation module, comprising:
defining a canister having an interior, a first open end in fluid communication with the interior of the canister, and a second open end opposite the first open end of the canister,
wherein the canister comprises stiffeners formed unitarily with the canister as a one-piece body and which extend radially outwardly from an outer surface of the canister and longitudinally along the canister between the first and second open ends to stiffen the canister and to eliminate a need to support the air separation module using a support structure, each of the stiffeners comprising fillets at respective bases thereof;
arranging a separator within the interior of the canister, the separator fluidly coupling the second open end of the canister with the first open end of the canister;
defining a first end cap with a one-piece first end cap body, wherein the one-piece first end cap body has a first flange portion and an aircraft-mounting portion;

fixing the first flange portion of the one-piece first end cap body to the first open end of the canister; and supporting the canister with the aircraft mounting portion through the first flange portion of the one-piece first end cap body without an intermediate support structure.

14. The method of claim 13, further comprising:

defining a second end cap with a one-piece second end cap body, the one-piece second end cap body having a second flange portion and a conduit portion; and fixing the second flange portion of the one-piece second end cap body to the second open end of the canister such that the conduit of the one-piece second end cap body is in fluid communication with the separator.

15. The method of claim 14, further comprising:

defining a temperature sensor seat portion on the one-piece second end cap body;

seating a temperature sensor directly on the temperature sensor seat portion and without an intermediate duct; and seating a flow control valve directly on the conduit portion of the one-piece second end cap body and without an intermediate duct.

16. The method of claim 14, further comprising:

defining an oxygen sensor probe seat portion on the one-piece second end cap body;

defining an oxygen sensor seat portion on the one-piece second end cap body;

seating an oxygen sensor probe directly on the temperature sensor seat portion of the one-piece second end cap body;

seating an oxygen sensor directly on the oxygen sensor seat of the of the one-piece second end cap body; and fluidly coupling the oxygen sensor probe to the oxygen sensor with a sensor conduit.

17. An air separation module, comprising:

a canister having an interior and first and second open ends opposite one another and in fluid communication with the interior, wherein the canister comprises stiffeners formed unitarily with the canister as a one-piece body and which extend radially outwardly from an outer surface of the canister and longitudinally along the canister between the first and second open ends to stiffen the canister and to eliminate a need to support the air separation module using a support structure, each of the stiffeners comprising fillets at respective bases thereof;

a separator arranged within the interior of the canister, the separator fluidly coupling the first and second open ends of the canister; and first and second end caps, each with a one-piece first or one-piece second end cap body fixed to the first and second open ends of the canister, respectively.

18. The air separation module according to claim 17, wherein:

the one-piece first end cap body has a flange portion through which the canister is supported by an aircraft-mounting portion without an intermediate support structure and a boss portion defining an inlet therethrough in fluid communication with the separator through the first open end, and the one-piece second end cap body has a second flange portion for fixing the second end cap to the second open end of the canister and a conduit portion in fluid communication with the separator.

\* \* \* \* \*